(12) United States Patent
Baba

(10) Patent No.: US 10,983,748 B2
(45) Date of Patent: Apr. 20, 2021

(54) INFORMATION MANAGEMENT APPARATUS, INFORMATION SHARING SYSTEM, AND TERMINAL

(71) Applicant: Hiroshi Baba, Kanagawa (JP)

(72) Inventor: Hiroshi Baba, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 10 days.

(21) Appl. No.: 16/263,242

(22) Filed: Jan. 31, 2019

(65) Prior Publication Data
US 2019/0265941 A1    Aug. 29, 2019

(30) Foreign Application Priority Data

Feb. 28, 2018  (JP) .................................. 2018-035692
Jul. 24, 2018   (JP) .................................. 2018-138751

(51) Int. Cl.
*G06F 3/14*    (2006.01)
*G06F 16/955*  (2019.01)
(Continued)

(52) U.S. Cl.
CPC .......... *G06F 3/1454* (2013.01); *G06F 3/1462* (2013.01); *G06F 16/955* (2019.01);
(Continued)

(58) Field of Classification Search
CPC .... G06F 3/1454; G06F 3/1462; G06F 16/955; H04L 67/146; H04L 65/403;
(Continued)

(56) References Cited

U.S. PATENT DOCUMENTS

2008/0055667 A1    3/2008  Baba
2013/0071822 A1*   3/2013  Humphreys ............. G09B 5/00
                                                      434/236
(Continued)

FOREIGN PATENT DOCUMENTS

JP    2009-027656    2/2009
JP    2014-199657   10/2014
(Continued)

OTHER PUBLICATIONS

Extended European Search Report dated May 7, 2019 in European Patent Application 19157389.8, 18 pages.

*Primary Examiner* — Mark W Regn
(74) *Attorney, Agent, or Firm* — Oblon, McClelland, Maier & Neustadt, L.L.P.

(57) ABSTRACT

An information sharing system includes a first terminal, a second terminal and an information management apparatus. The first terminal is configured to control a first display to output a first screen shareable by a plurality of users. The second terminal is operated by a user of the plurality of users and the second terminal is configured to control a second display to output a second screen to be viewed by the user. The information management apparatus transmits, in response to the screen acquisition request, a request for image data to the first terminal, acquires image data of the first screen from the first terminal, and updates screen information according to the image data. The second terminal further receives the screen information from the information management apparatus, and controls the second display to update the output of the second display based on the screen information.

18 Claims, 28 Drawing Sheets

(51) Int. Cl.
*H04L 29/06* (2006.01)
*H04L 29/08* (2006.01)

(52) U.S. Cl.
CPC .......... *H04L 65/403* (2013.01); *H04L 67/146* (2013.01); *G09G 2370/022* (2013.01); *G09G 2370/042* (2013.01)

(58) Field of Classification Search
CPC ..... H04L 67/1095; H04L 67/02; H04L 67/06; H04L 67/141; G09G 2370/022; G09G 2370/042
See application file for complete search history.

(56) References Cited

U.S. PATENT DOCUMENTS

2014/0002389 A1\* 1/2014 Kim ...................... G06F 3/1454
345/173
2014/0258334 A1 9/2014 Mukasa

FOREIGN PATENT DOCUMENTS

| | | |
|---|---|---|
| JP | 2015-118425 | 6/2015 |
| JP | 2017-45180 A | 3/2017 |
| JP | 2017045180 A \* | 3/2017 |

\* cited by examiner

INFORMATION MANAGEMENT APPARATUS, INFORMATION SHARING SYSTEM, AND TERMINAL

CROSS-REFERENCE TO RELATED APPLICATIONS

This patent application is based on and claims priority under 35 U.S.C. § 119(a) to Japanese Patent Application Nos. 2018-035692, filed on Feb. 28, 2018, and 2018-138751, filed on Jul. 24, 2018, the entire disclosures of which are incorporated herein by reference.

BACKGROUND

Technical Field

The present disclosure relates to an information management apparatus, an information sharing system, and terminal.

Description of the Related Art

At gatherings such as conferences, meetings, and presentations, where plural participants gather for a certain purpose, presentation materials are displayed on a first terminal having a large screen, for example. The first terminal displays the materials on the large screen, and the participants discuss based on the materials or give explanation about the materials. In this case, the materials are displayed not only on the large screen of the first terminal, but also on a second terminal that each participant brings with himself or herself. Each participant attends the meeting or the like while viewing the materials displayed on his or her own terminal.

Therefore, each participant needs to obtain the materials. Conventionally, each participant receives the materials sent by e-mail or accesses a specific URL (uniform resource locator) to download the material. A technique is also known in which a first terminal displays materials together with information indicating how to specify the materials and a participant who needs the materials acquires the materials based on the information indicating how to specify the material. For example, an information processing system is known that projects a QR (quick response) code including information identifying a file being projected. According to the information processing system, a second terminal of an arbitrary participant reads the displayed QR code to download the file being projected.

SUMMARY

An information sharing system includes a first terminal, a second terminal and an information management apparatus. The first terminal includes first processing circuitry configured to control a first display to output a first screen shareable by a plurality of users. The second terminal is operated by a user of the plurality of users, and the second terminal including second processing circuitry configured to control a second display to output a second screen to be viewed by the user. The information management apparatus is communicable with the first terminal and the second terminal via a network.

The second processing circuitry is configured to transmit, to the information management apparatus, a screen acquisition request that requests acquisition of the first screen output by the first display. The information management apparatus comprises third processing circuitry configured to: transmit, in response to the screen acquisition request from the second terminal, a request for image data to the first terminal; acquire image data of the first screen from the first terminal; and update screen information to be transmitted to the second terminal according to the image data. The second processing circuitry is further configured to: receive the screen information from the information management apparatus; and control the second display to update the output of the second display based on the received screen information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
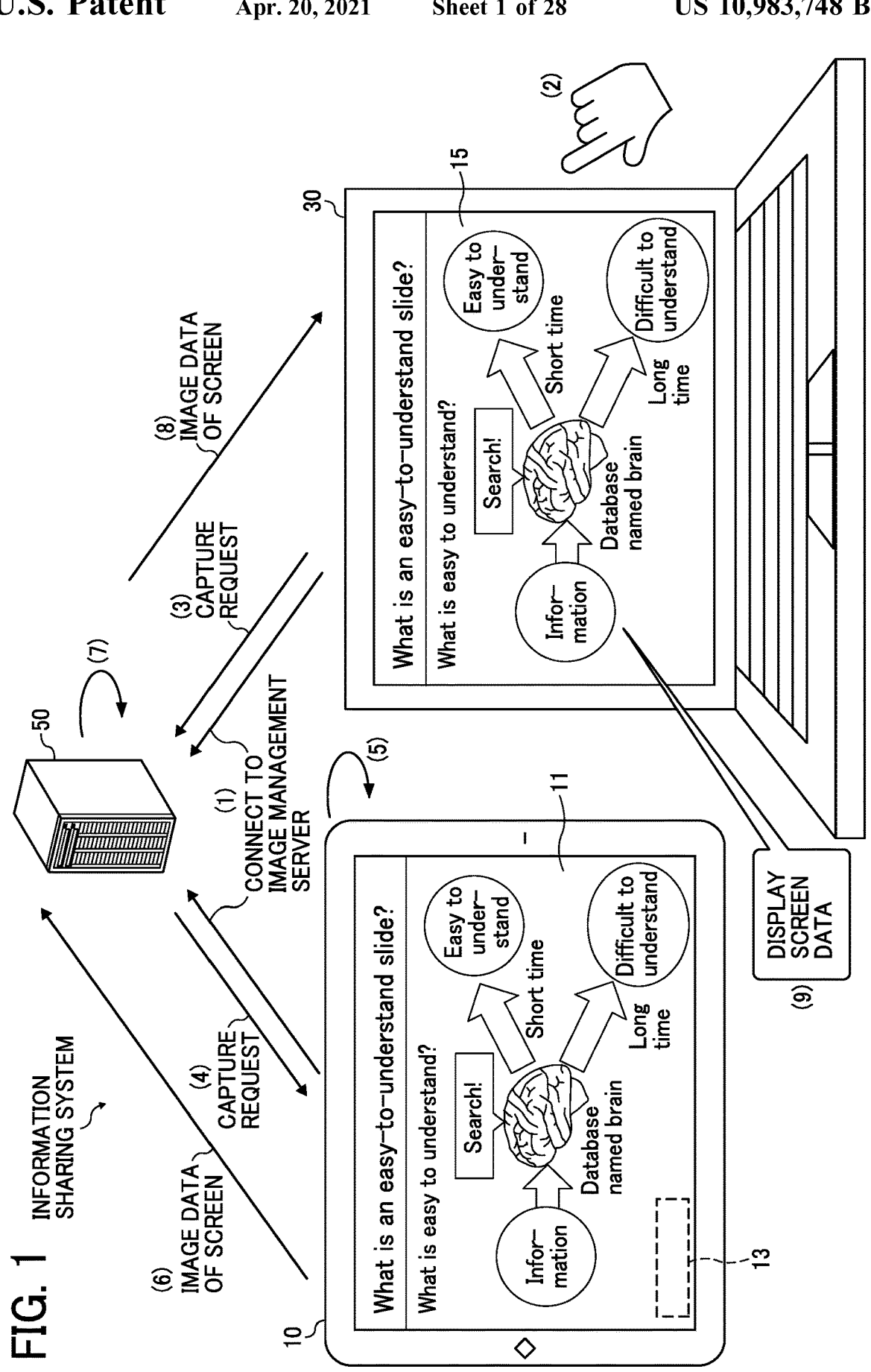
FIG. 1 is an illustration for describing an overview of a procedure in which a second terminal displays a screen being displayed by a first terminal having a large screen, according an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF THE DRAWINGS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

A description is given of example embodiments of an information sharing system and a method of sharing information performed by the information sharing system with reference to the drawings.

<Overview of Operation by Information Sharing System>

First, with reference to FIG. 1, an overview of an operation by an information sharing system according to the present embodiment is described. FIG. 1 is an illustration for describing an overview of a procedure in which a second terminal 30 displays a screen being displayed by a first terminal 10 having a large screen. The first terminal 10 is a computer that a plurality of users can jointly use or share and whose screen is viewed by the plurality of users. Such a first terminal 10 may be referred to as a "shared terminal". The second terminal 30 is a computer that a user can use individually or exclusively and whose screen is viewed by the user individually. Such a second terminal 30 may be referred to as a "privately-owned terminal", but second terminal 30 is not limited to being privately-owned. Second terminal 30 may be public, private, non-profit, rental or any other type of ownership terminal in which a user may individually or exclusively use the terminal and whose screen is viewed by the user individually.

First, as a premise, in the first terminal 10, a material display application 11 displays a content (image) of presentation material. Further, in the first terminal 10, an auxiliary application 13 for capturing a screen operates. In the second terminal 30, a browser application 15 operates.

(1) The first terminal 10 connects to the image management server 50 at the time of activation or the like. The image management server 50 is an example of an information management device apparatus. The second terminal 30 connects to a predetermined URL of the image management server 50 through operations of the first and second embodiments described later. This URL is a URL that allows the second terminal 30 to share a screen with the first terminal 10.

(2) A user of the second terminal 30 who wants to own a screen displayed by the first terminal 10 presses a predetermined button.

(3) In response to pressing of the specific button by the user, the second terminal 30 transmits a capture request to the image management server 50. This capture request is an example of a screen acquisition request.

(4) The image management server 50 transmits the capture request to the first terminal 10 while specifying an IP address of the first terminal 10, which is acquired when the first terminal 10 connects to the image management server 50. The IP address is one of address information of the first terminal.

(5) In response to acquiring the capture request, the auxiliary application 13 captures the screen being displayed on a screen by the material display application 11.

(6) The auxiliary application 13 of the first terminal 10 transmits image data of the screen to the image management server 50.

(7) The image management server 50 adds the image data to screen information (web page) to be transmitted to the browser application 15.

(8) The browser application 15 of the second terminal 30 acquires the screen information including the image data of the screen from the image management server 50.

(9) Thus, the second terminal 30 displays the screen being displayed by the first terminal 10 on a display.

As described above, according the information sharing system of the present embodiment, the first terminal 10 and the second terminal 30 connect to the image management server 50 and thereby the second terminal 30 displays a screen being displayed by the first terminal 10.

<Terms>

In the embodiments, a "display device" is a device that displays an image. The display device is sometimes referred to as a "display". In alternative to the general-purpose display such as a liquid crystal display, the display device can be a projector.

An "electronic canvas" is a function implemented by an electronic canvas application or a screen displayed by the electronic canvas application. In this disclosure, the "electronic canvas" is not a plain-woven thick cloth but a virtual canvas generated in the image management server 50. For example, a web application having a function of allowing a user to write handwritten information or a function of displaying an image with the canvas element and JavaScript (registered trademark) or the like corresponds to the electronic canvas. For descriptive purposes, in this disclosure, the electronic canvas application and the electronic canvas may not be distinguished clearly from each other.

Acquisition of a screen refers to capturing a screen or generating image data of a screen. In one example, an entire screen is captured. In another example, the image data of the screen is divided a part of the image data of the screen is cut out, to capture a part of the image. The acquisition of the screen is referred to as "trimming" or "capture" in some cases.

<Example of System Configuration>

Figure 2:
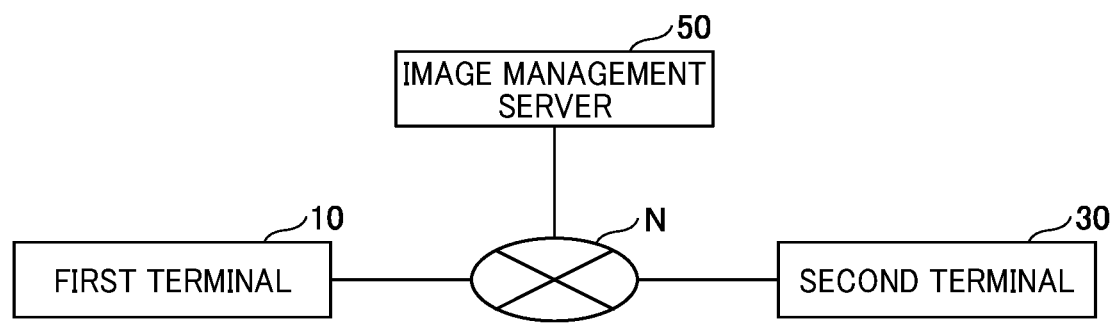
FIG. 2 is a schematic diagram illustrating an example of a configuration of an information sharing system, according an embodiment of the present disclosure.

FIG. 2 is a schematic diagram illustrating an example of a configuration of the information sharing system, according to the present embodiment. The information sharing system includes the first terminal 10, the second terminal 30, and the image management server 50, which are communicable with each other via a network N. Although FIG. 2 illustrates an example in which the information sharing system includes one first terminal 10 and one second terminal 30, in another example, the information sharing system can include two or more first terminals 10 and two or more second terminals 30.

The first terminal 10 and the second terminal 30 are described in different names because they have different roles in the present embodiment. However, each of the first terminal 10 and the second terminal 30 can be an information processing apparatus of the same type. FIG. 1 illustrates an example in which a display of the first terminal 10 displaying information is depicted larger than a display of the second terminal 30. In another example, the displays of the first terminal 10 and the second terminal 30 have the same size. In still another example, the display of the second terminal 30 is larger than the display of the first terminal 10. In other words, a device that displays information and performs capturing is the first terminal 10.

It is preferable that each of the first terminal 10 and the second terminal 30 includes a touch panel. However, in the present embodiment, the touch panel is optional. When the second terminal 30 includes a touch panel, there is an advantage that a user can write characters or draw a picture with his or her finger, an electronic pen or the like on an image displayed based on image data acquired from the first terminal 10. The handwriting function can be substituted by a mouse or a trackball.

The first terminal 10 is a general-purpose information processing apparatus. Examples of the first terminal 10 include, but not limited to, a tablet terminal, a smartphone, a laptop computer, and a personal digital assistant (PDA). The first terminal 10 is any device on which a desired material display application 11 and the auxiliary application 13 operate. In another example, the first terminal 10 is an electronic whiteboard (or an electronic board, an information board, etc.) that displays handwritten information or a screen acquired from a personal computer (PC). In still another example, the first terminal 10 is a device that projects an image such as a projector. In still another example, the first terminal 10 is a device that displays images of plural sites such as a videoconference terminal. In still another example the first terminal 10 is a television receiver.

Like the first terminal 10, examples of the second terminal 30 include a tablet terminal, a smartphone, a laptop computer, and a PDA. The second terminal 30 is any device on which a browser application operates. For example, the first terminal is a multifunction peripheral, a car navigation device, a game machine, a television receiver, or the like.

The image management server 50 is one or more information processing apparatuses having a function as a web server (or an HTTP server) that transmits screen information to the second terminal 30. The screen information is provided as a web page generated by a web application. The "web application" refers to software that operates by cooperation between a program described in a script language such as JavaScript (registered trademark) operating on a browser application and a program on the web server side, which operate in cooperation with each other, and is used on the browser or such mechanism.

The image management server 50 provides the second terminal 30 with a web application by which the second terminal 30 is used like the electronic canvas. In the present embodiment, this web application is referred to as an electronic canvas application. The second terminal 30 can use the electronic canvas application, provided that the browser application 15 operates on the second terminal 30.

In one example, the image management server 50 supports cloud computing. The "cloud computing" refers to computing where resources on a network are used or accessed without identifying specific hardware resources.

The network N is, for example, one or more local area networks (LANs) inside the firewall. In another example, the network N includes the Internet that is outside the firewall in addition to the LAN. In another example, the network N further includes a virtual private network (VPN) and/or a wide-area Ethernet (registered trademark). The network N is any one of a wired network, a wireless network, and a combination of the wired network and the wireless network. In a case where the first terminal 10, the second terminal 30 or the image management server 50 connects to the network N through a mobile phone network such as 3G, Long Term Evolution (LTE), 4G, the LAN can be omitted.

<Example of Hardware Configuration>

Figure 3:
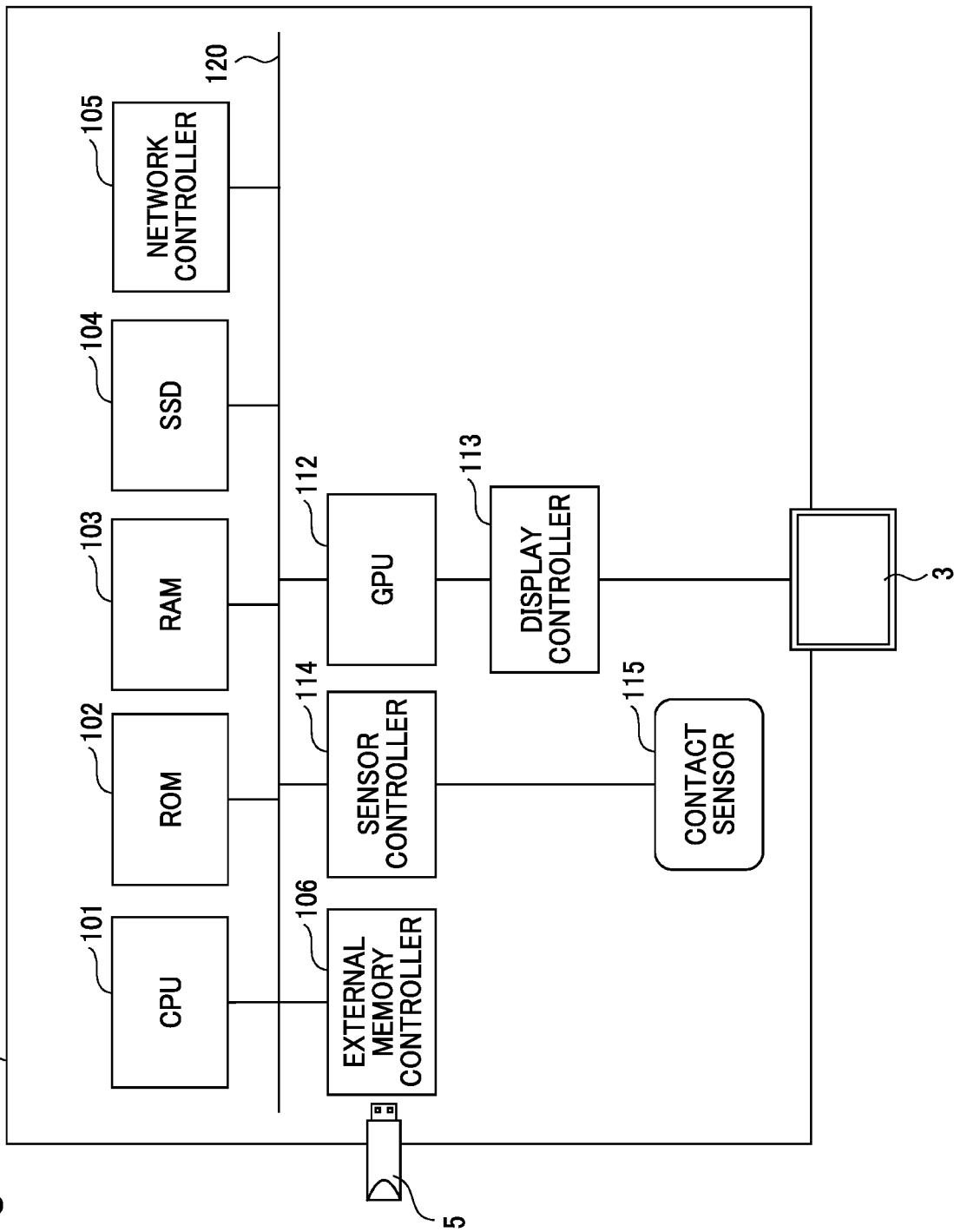
FIG. 3 is a block diagram illustrating an example of a hardware configuration of each of the first terminal and the second terminal, according an embodiment of the present disclosure.

Second terminal 30:

With reference to FIG. 3, a description is given of hardware configurations of the first terminal 10 and the second terminal 30, according to the present embodiment. FIG. 3 is a block diagram illustrating an example of a hardware configuration of each of the first terminal 10 and the second terminal 30. In the following description of FIG.

3, it is assumed that each of the first terminal 10 and the second terminal 30 is a general-purpose information processing apparatus.

As illustrated in FIG. 3, each of the first terminal 10 and the second terminal 30 includes a central processing unit (CPU) 101, a read only memory (ROM) 102, a random access memory (RAM) 103, a solid state drive (SSD) 104, a network controller 105, and an external memory controller 106. The CPU 101 controls entire operation of each of the first terminal 10 and the second terminal 30. The ROM 102 stores a control program for controlling the CPU 101 such as an initial program loader (IPL). The RAM 103 is used as a work area for the CPU 101. The SSD 104 stores various data including a program for each of the first terminal 10 and the second terminal 30. The network controller 105 controls communication with an external device through the network N. The external memory controller 106 controls communication between each of the first terminal 10 and the second terminal 30 and a universal serial bus (USB) memory 5.

CPU 101 may include modules, parts, circuits, processing circuitry and/or integrated circuits, all of which may be referred to as processing circuitry. The processing circuitry may include a general-purpose processor, and the processing circuitry may include any number of processors, controllers, micro-controllers or state machines. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform functions.

Each of the first terminal 10 and the second terminal 30 further includes a graphics processing unit (GPU) 112 and a display controller 113. The GPU 112 is dedicated to processing a graphical image. The display controller 113 controls display of an image processed at the GPU 112 for output through a display 3. GPU 112 may include modules, parts, circuits, processing circuitry and/or integrated circuits, all of which may be referred to as processing circuitry. Moreover, GPU 112 may include processing circuitry that is separate from the processing circuitry of CPU 101. Alternatively, GPU 112 and CPU 101 may be encompassed by the same processing circuitry.

Further, each of the first terminal 10 and the second terminal 30 includes a sensor controller 114 and a contact sensor 115. The sensor controller 114 controls operation of the contact sensor 115. The contact sensor 115 detects a touch onto the display 3 with an electronic pen 4 or a user's hand. For example, the contact sensor 115 detects a coordinate of a position touched by the user based on a change of capacitance (implements a touch panel). The contact sensor 115 can identify a contact position in various manners in addition to by detecting change of capacitance. For example, a resistance film touch panel can be used that identifies a contact position by detecting a change in voltage of two opposed resistance films. In another example, an electromagnetic induction touch panel that identifies a contact position by detecting electromagnetic induction caused by contact of an object to a display.

Each of the first terminal 10 and the second terminal 30 further includes a bus line 120, such as an address bus or a data bus, which electrically connects the CPU 101, the ROM 102, the RAM 103, the SSD 104, the network controller 105, the external memory controller 106, the GPU 112, and the sensor controller 114 to each other.

The program for each of the first terminal 10 and the second terminal 30 is stored on a computer-readable storage medium such as a compact disc read only memory (CD-ROM) for distribution, for example. In another example, the program is distributed from a server for program distribution.

Figure 4:
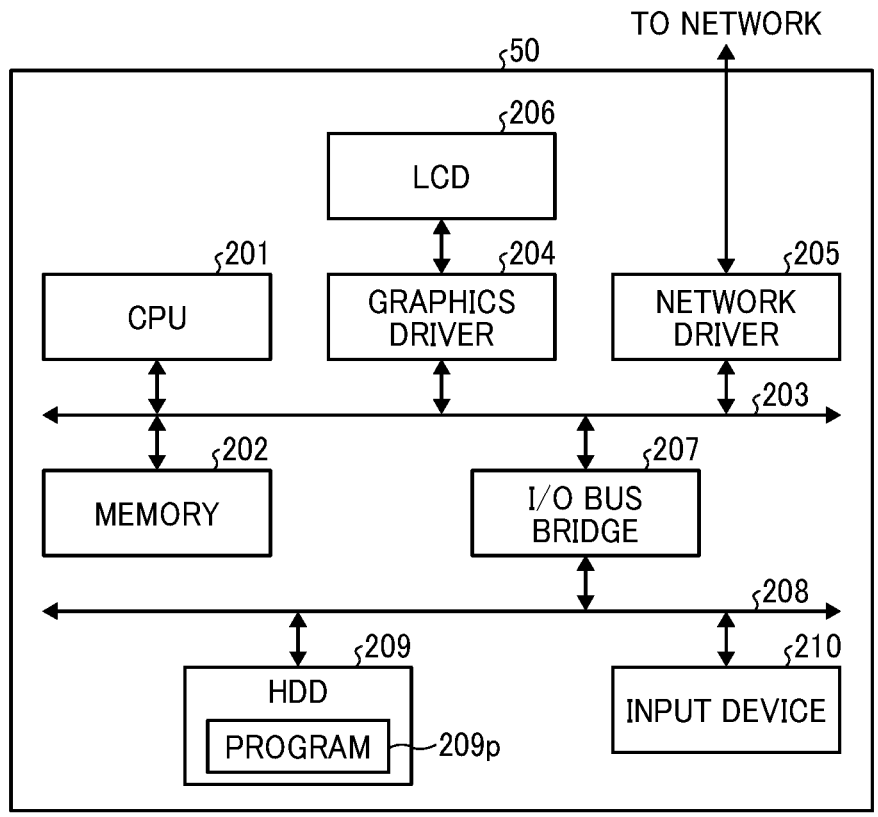
FIG. 4 is a block diagram illustrating an example of a hardware configuration of an image management server, according an embodiment of the present disclosure.

Image Management Server 50:

FIG. 4 is a block diagram illustrating an example of a hardware configuration of the image management server 50. The image management server 50 includes a CPU 201 and a memory 202 that enables high-speed access to data by the CPU 201. The CPU 201 and the memory 202 are connected to other hardware elements of the image management server 50, such as a graphics driver 204 and a network driver (NIC) 205, via a system bus 203.

CPU 201 may include modules, parts, circuits, processing circuitry and/or integrated circuits, all of which may be referred to as processing circuitry. The processing circuitry may include a general-purpose processor, and the processing circuitry may include any number of processors, controllers, micro-controllers or state machines. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform functions.

The graphics driver 204 is connected to a liquid crystal display (LCD) 206 via a bus, and monitors a result of processing by the CPU 201. Further, the network driver 205 connects the image management server 50 to the network N at a transport layer level and a physical layer level to establish a session with the first terminal 10 and the second terminal 30.

Further, an input/output (I/O) bus bridge 207 is connected to the system bus 203. On the downstream side of the I/O bus bridge 207, a storage device such as a hard disc drive (HDD) 209 is connected via an I/O bus 208 such as a peripheral component interconnect (PCI), in compliance with the Integrated Drive Electronics (IDE), Advanced Technology Attachment (ATA), AT Attachment Packet Interface (ATAPI), serial ATA, Small Computer System Interface (SCSI), USB, etc. The HDD 209 stores a program 209*p* for controlling entire operation of the image management server 50. The HDD 209 is replaceable with an SSD.

Further, an input device 210 such as a keyboard and a mouse (also referred to as a pointing device) is connected to the I/O bus 208 via a bus such as a USB. The input device 210 receives inputs or instructions from an operator such as a system administrator.

The illustrated hardware configuration of the image management server 50 is not necessarily housed in one housing nor provided as apparatus of one unit. The illustrated hardware configuration indicates hardware elements preferably included in the image management server 50. In addition, in order to support cloud computing, a physical configuration of the image management server 50 of the present embodiment is not necessarily fixed. In other words, the image management server 50 is configured as hardware resources that dynamically connect/disconnect according to load.

Figure 5A:
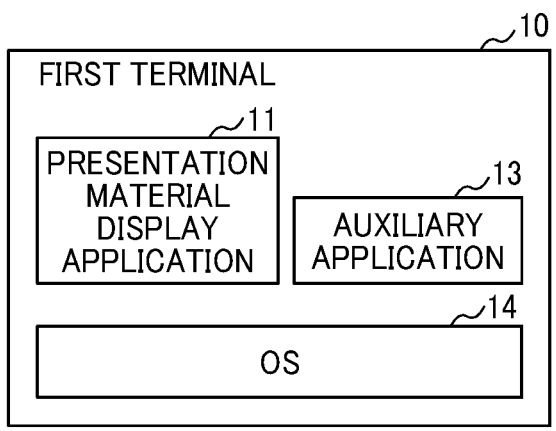
FIG. 5A is a block diagram illustrating an example of a configuration of software operating on the first terminal, according an embodiment of the present disclosure.
Figure 5B:
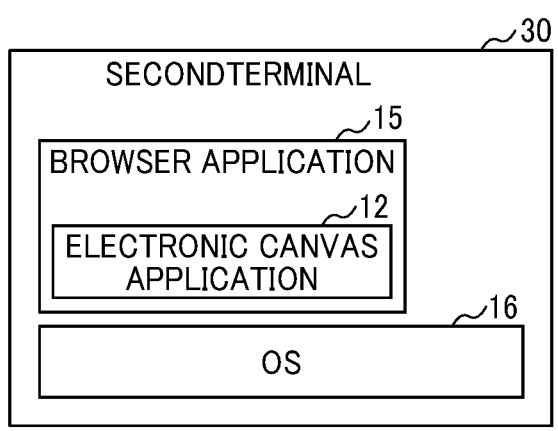
FIG. 5B is a block diagram illustrating an example of a configuration of software operating on the second terminal, according an embodiment of the present disclosure.

Next, with reference to FIG. 5A and FIG. 5B, a description is given of a software configuration of the first terminal 10 and the second terminal 30. FIG. 5A is a block diagram illustrating an example of a configuration of software operating on the first terminal 10. An operating system (OS) 14 operates on the first terminal 10. The material display application 11 and the auxiliary application 13 operates on the OS 14.

Examples of the OS 14 include, but not limited to, Android (registered trademark), iOS (registered trademark), Windows (registered trademark), UNIX (registered trademark), LINUX (registered trademark), and macOS (registered trademark). The OS can vary depending on the model of the first terminal 10.

The material display application 11 is an application for displaying materials of a meeting, for example. The materials displayed by the material display application 11 are shared by users. Since it depends on a user's attributes or circumstances as to what is used as the material, the material display application 11 can be any application that operates on the OS 14 and displays some kinds of screen. For example, at a conference, a presentation application is used as the material display application 11. In addition, a browser application for displaying information on the Internet, a word processing application for editing or displaying a document, a spreadsheet application, and the like can also be used as the material display application 11. Further, a photograph application for displaying photographs, a game application such as a local game and an online game, a painting application that allows a user to draw a picture, a file management application, and the like can also be used as the material display application 11. The above described applications are examples of the material display application 11 and any other suitable application can be used as the material display application 11.

The auxiliary application 13 provides an auxiliary function that enables the second terminal 30 to display an image based on image data of a screen generated by the material display application 11. For example, the auxiliary application 13 performs communication with the image management server 50 or invokes an API (application interface) of the OS 14 to capture the screen generated by the material display application 11. The auxiliary application 13 reduces restrictions on the material display application 11. Accordingly, a user can use a general-purpose application as the material display application 11. Since the material display application 11 does not require any special function, a desired application can be used as the material display application 11. The auxiliary application 13 needs to have a function of receiving a request from the electronic canvas application via the image management server 50. Therefore, the auxiliary application 13 and the electronic canvas application 12 operate in cooperation with each other via the image management server 50.

Since the auxiliary application 13 acquires image data of a screen generated by the material display application 11 by using functions of the OS 14, the auxiliary application 13 deals with functions that are heavily dependent on a model of the first terminal 10. For this reason, the auxiliary application 13 is a native application. A term "native application" is used in comparison with a web application. The "native application" refers to an application that is installed in the first terminal 10 for execution. The native application is an application that uses functions of the OS 14 and controls hardware.

Since the auxiliary application 13 according to the present embodiment operates inside the first terminal 10, the auxiliary application 13 does not have to display a screen in principle. However, in some cases, the auxiliary application 13 displays an auxiliary application ID and a URL of the electronic canvas as described later.

FIG. 5B is a block diagram illustrating an example of a configuration of software operating on the second terminal 30. An OS 16 operates on the second terminal 30. The electronic canvas application 12 operates on the OS 16. The OS 14 of the first terminal 10 and the OS 16 of the second terminal 30 do not need be the same type.

The browser application 15 acquires a script that is to operate on the browser application 15 from the image management server 50 by specifying an URL of the electronic canvas and executes the acquired script to implement the electronic canvas application 12. The electronic canvas application 12 is a web application that provides a user with a function of the electronic canvas. As described above, the electronic canvas application 12 includes a function of displaying an image based on the image data of a screen generated by the material display application 11 and a function of displaying handwritten information. In a case where the browser application 15 has a function of displaying an image based on the image data of the screen generated by the material display application 11, the electronic canvas application 12 does not have to include the function of the electronic canvas (does not have to include a handwriting function). In another example, the electronic canvas application 12 merely acquires image data from the image management server 50 and displays an image based on the acquired image data. In this case, the script is not necessarily required, and the electronic canvas application 12 having a function of acquiring, from the image management server 50, information including the image data of the screen generated by the material display application 11 to be displayed by the browser application 15 will suffice. Therefore, the browser application 15 does not have to execute a script. Further, an application having a function equivalent to that of the browser application 15 will suffice.

Since the electronic canvas application 12 is executed on the browser application 15, dependence on a model of the second terminal 30 is low. Since the electronic canvas application 12 is a web application and operates by executing a script transmitted from the image management server 50, installation is unnecessary. On the other hand, it is often difficult for the web application to utilize functions of the OS 16 or to control hardware.

First Embodiment

In the present embodiment, a description is given of an example in which an electronic canvas is generated by the second terminal 30 and image data of a screen displayed by the first terminal 10 is displayed on the electronic canvas. Since the generated electronic canvas is not associated with the first terminal 10, a user of the second terminal 30 needs to inform the image management server 50 of which first terminal 10 the user is viewing. For this reason, the auxiliary application 13 that is resident in the first terminal 10 displays an auxiliary application ID. The second terminal 30 transmits this auxiliary application ID to the image management server 50 in accordance with the user's operation. The image management server 50 identifies the first terminal 10 based on the auxiliary application ID and adds a screen being displayed by the first terminal 10 to screen information of the electronic canvas generated by the second terminal 30.

<Functions>

Figure 6:
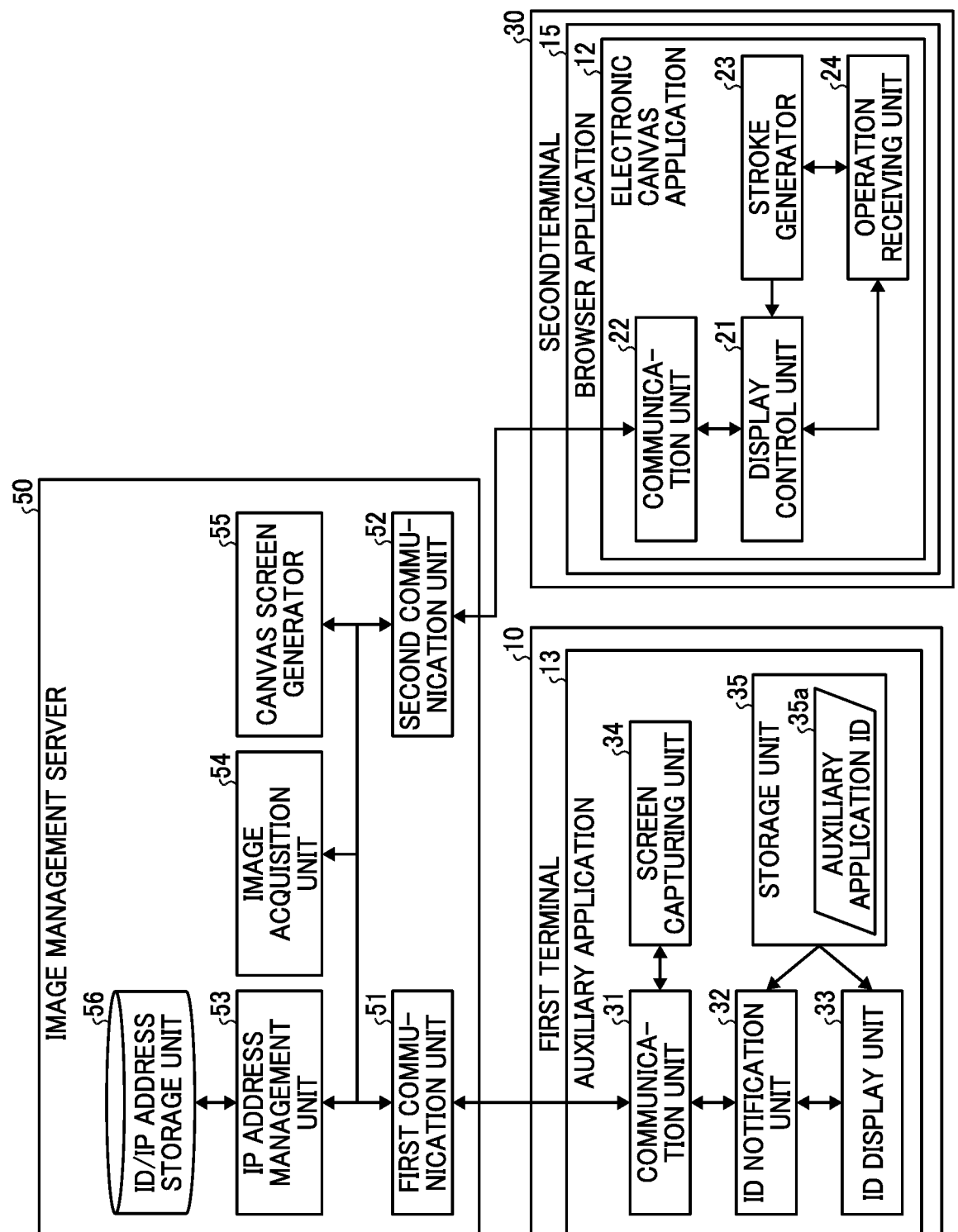
FIG. 6 is a block diagram illustrating an example of a functional configuration of each of the first terminal, the second terminal, and the image management server, according to an embodiment of the present disclosure.

Functions of the electronic canvas application 12, the auxiliary application 13, and the image management server 50 are described with reference to FIG. 6. FIG. 6 is a block diagram illustrating an example of a functional configuration of each of the first terminal 10, the second terminal 30, and the image management server 50. Since the material display application 11 will suffice, provided that it includes a function of displaying a screen, functions of the material display application 11 are described as needed.

Electronic Canvas Application 12:

The electronic canvas application 12 includes a display control unit 21, a communication unit 22, a stroke generator 23, and an operation receiving unit 24. The display control unit 21, the communication unit 22, the stroke generator 23, and the operation receiving unit 24 of the second terminal 30 are functions or means that are implemented by or that are caused to function by operating any of the elements illustrated in FIG. 3 in cooperation with instructions of the CPU 101 according to the program loaded from the SSD 104 onto the RAM 103 and the script transmitted from the image management server 50.

The communication unit 22 transmits and receives various information to and from the image management server 50. For example, the communication unit 22 receives screen information described in HTML, CSS (Cascade Style Sheet), and JavaScript (registered trademark) from the image management server 50. Further, the communication unit 22 transmits handwritten information that is input by handwriting by a user to the image management server 50.

The operation receiving unit 24 receives various operations by the user input to the electronic canvas application 12. For example, the operation receiving unit 24 receives pressing of a button displayed on a menu or handwritten information input to the touch panel.

The stroke generator 23 generates a stroke based on the handwritten information input to the touch panel received by the operation receiving unit 24. Since the handwritten information received by the operation receiving unit 24 is a list of coordinates of points, plural points are merely displayed if the handwritten information is displayed as is. For this reason, the stroke generator 23 generates a stroke by linking the points with color, thickness, a line type or the like specified by the user.

The display control unit 21 analyzes the screen information received by the communication unit 22 and displays a web page on a display device (the display 3 or the LCD 206). Further, the display control unit 21 displays the stroke generated by the stroke generator 23 on the display device.

Auxiliary Application 13:

The auxiliary application 13 includes a communication unit 31, an ID notification unit 32, an ID display unit 33, and a screen capturing unit 34. The communication unit 31, the ID notification unit 32, the ID display unit 33, and the screen capturing unit 34 of the first terminal 10 are functions or means that are implemented by or that are caused to function by operating any of the elements illustrated in FIG. 3 in cooperation with instructions of the CPU 101 according to the program loaded from the SSD 104 onto the RAM 103.

Further, the auxiliary application 13 includes a storage unit 35 implemented by the SSD 104, the RAM 103 or the like illustrated in FIG. 3 and stores the auxiliary application ID 35a in the storage unit 35.

The communication unit 31 transmits and receives various information to and from the image management server 50. In the present embodiment, the communication unit 31 transmits the auxiliary application ID to the image management server 50 and transmits image data of a screen to the image management server 50.

The ID notification unit 32 notifies the image management server 50 of the auxiliary application ID 35a via the communication unit 31, in response to, for example, activation of the first terminal 10 or operation by the user. The auxiliary application ID 35a is identification information for identifying or specifying the auxiliary application 13. In the present embodiment, the auxiliary application ID 35a is used as identification information for identifying or specifying the first terminal 10. Since the auxiliary application ID is set in the auxiliary application 13 before shipment from a factory, the auxiliary application ID is basically a fixed value. However, in an exceptional case, a user can change the auxiliary application ID. The ID notification unit 32 sends a request for changing the auxiliary application ID to the image management server 50 via the communication unit 31. When the image management server 50 confirms that the requested auxiliary application ID does not overlap with any other auxiliary application ID, the change is accepted.

The ID display unit 33 displays the auxiliary application ID in at least a partial area of the display 3 of the first terminal 10. A display surface of the display 3 is referred to as a screen, and it can be said that the auxiliary application ID is displayed on the screen. For example, the ID display unit 33 displays the auxiliary application ID on a transparent layer on a front side (a side closer to a user) of the first terminal 10. The ID display unit 33 displays the auxiliary application ID in one of four corners of the screen, for example, preferably as semi-transparent, so as not to hide information displayed by the material display application 11. The auxiliary application ID does not have to be constantly displayed. For example, the ID display unit 33 periodically displays the auxiliary application ID. In another example, the ID display unit 33 display the auxiliary application ID in response to a user's instruction for displaying the auxiliary application ID.

The screen capturing unit 34 requests the OS 14 to capture the screen. In response to the request, the OS 14 transmits image data including at least materials being displayed by the material display application 11 to the screen capturing unit 34. In the present embodiment, a description is provided on the assumption that the material display application 11 displays materials in an entire area of the display 3. When material is displayed in a partial area of the display 3, the OS 14 crops (trims) a material part in image data of an entire area of the display 3 (entire area of the screen) according to a display area generated by the material display application 11.

Image Management Server 50:

The image management server 50 includes a first communication unit 51, a second communication unit 52, an IP address management unit 53, an image acquisition unit 54, and a canvas screen generator 55. The first communication unit 51, the second communication unit 52, the IP address management unit 53, the image acquisition unit 54, and the canvas screen generator 55 of the image management server 50 are functions or means that are implemented by or that are caused to function by operating any of the elements illustrated in FIG. 4 in cooperation with instructions of the CPU 201 according to the program loaded from the HDD 209 onto the memory 202. Further, the image management server 50 has an ID/IP address storage unit 56 implemented by the HDD 209 and/or the memory 202 illustrated in FIG. 4.

The first communication unit 51 transmits and receives various information to and from the first terminal 10. For example, the first communication unit 51 receives the auxiliary application ID and image data of the screen from the first terminal 10, and transmits the capture request to the first terminal 10.

The second communication unit 52 transmits and receives various information to and from the second terminal 30. For example, the second communication unit 52 transmits the screen information described in HTML, CSS, and JavaScript (registered trademark) to the second terminal 30. Further, the second communication unit 52 receives the handwritten information that is input by handwriting by a user from the second terminal 30.

The IP address management unit 53 registers an IP address of the first terminal 10 and the auxiliary application ID in the ID/IP address storage unit 56 in association with each other. Since the IP address management unit 53 acquires the IP address of the first terminal 10 when the auxiliary application ID is notified, the IP address management unit 53 registers this IP address and the notified auxiliary application ID in the ID/IP address storage unit 56.

In response to receiving the capture request specifying the auxiliary application ID from the second terminal 30 via the first communication unit 51, the image acquisition unit 54 acquires, via the IP address management unit 53, the IP address of the first terminal 10 associated with the auxiliary application ID from the IP address management unit 53, and transmits the screen capture request to the first terminal 10 via the first communication unit 51. Further, the image acquisition unit 54 transmits image data of the material display application 11 acquired from this first terminal 10 to the second terminal 30.

The canvas screen generator 55 performs management of the electronic canvas. First, the canvas screen generator 55 performs generation and deletion of an electronic canvas screen. For example, in response to a request for generation of a new electronic canvas from the second terminal 30, the canvas screen generator 55 generates an electronic canvas. In order to simplify the description, assuming that one URL corresponds to one electronic canvas, the canvas screen generator 55 assigns a new URL to an electronic canvas and generates screen information for the electronic canvas to generate the electronic canvas.

Further, in response to a request for deletion of the electronic canvas from the second terminal 30, the canvas screen generator 55 deletes the electronic canvas.

The canvas screen generator 55 manages data for each electronic canvas. Since the data is data displayed on the electronic canvas, examples of the data include handwritten information, text memo, and image data. Contents and display positions of these handwritten information, text memo, image data or the like are managed for each electronic canvas.

Further, the canvas screen generator 55 generates screen information using the data managed by the canvas screen generator 55. For example, when a plurality of strokes are overlapped with each other, the plurality of strokes are combined into one object. This improves image quality against enlargement, reduction, rotation, etc.

One of HTML elements suitable for the electronic canvas is Canvas element. The Canvas element is used for drawing figures or the like by scripting with JavaScript (registered trademark). The canvas screen generator 55 updates the screen information each time data such as handwriting is added.

When the screen information is updated, the second communication unit 52 notifies each second terminal 30 (except for the second terminal 30 that has transmitted the handwritten information) indicated by the URL of the electronic canvas of the update. Since the second terminal 30 accesses the URL of the electronic canvas to acquire the screen information, the data displayed by the electronic canvas application 12 is shared almost in real time.

As described, since one electronic canvas is shared by a plurality of second terminals 30, the electronic canvas can be used in various gatherings such as conferences, meetings, and presentations.

TABLE 1

| Auxiliary Application ID | IP Address (First terminal) |
| --- | --- |
| 0123 | 10.60.100.100 |
| 2345 | 10.60.101.101 |

Table 1 is an example of information stored in the ID/IP address storage unit 56. In the ID/IP address storage unit 56, the auxiliary application ID and the IP address of the first terminal 10 are registered in association with each other. This allows the image management server 50 to identify the IP address of the first terminal 10 based on the auxiliary application ID.

<Display Example of Auxiliary Application ID>

Figure 7:
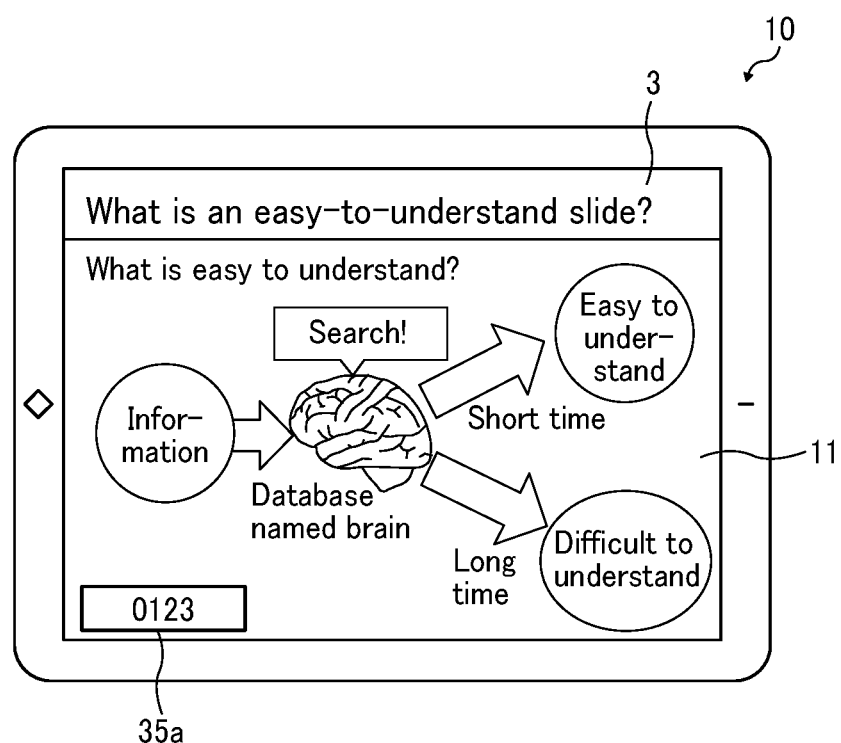
FIG. 7 is a diagram illustrating an example of an auxiliary application ID displayed on a display by the first terminal, according to an embodiment of the present disclosure.

FIG. 7 is a diagram illustrating an example of the auxiliary application ID displayed on the display 3 by the first terminal 10. In FIG. 7, the auxiliary application ID 35a indicated by "0123" as an example is displayed at the lower left of the display 3. A user of the second terminal 30 can enter the auxiliary application ID 35a to the second terminal 30 by looking at the displayed auxiliary application ID.

In another example, the auxiliary application ID is displayed as a two-dimensional code such as a bar code (one-dimensional code) or QR code (registered trademark). In still another example, instead of displaying the auxiliary application ID on the screen, the first terminal 10 transmits the auxiliary application ID to the second terminal 30 by short-range radio such as NFC (Near Filed Communication) or Bluetooth (registered trademark).

In still another example, the display position of the auxiliary application ID is any one of the four corners of the display 3. This reduces the possibility that characters or the like displayed by the material display application 11 overlap with the auxiliary application ID. It is preferable that the auxiliary application ID is displayed as semi-transparent so that both characters or the like displayed by the material display application 11 and the auxiliary application ID can be recognized even when they are overlapped with each other.

<Example of Screen of the Second Terminal 30>

Figure 8:
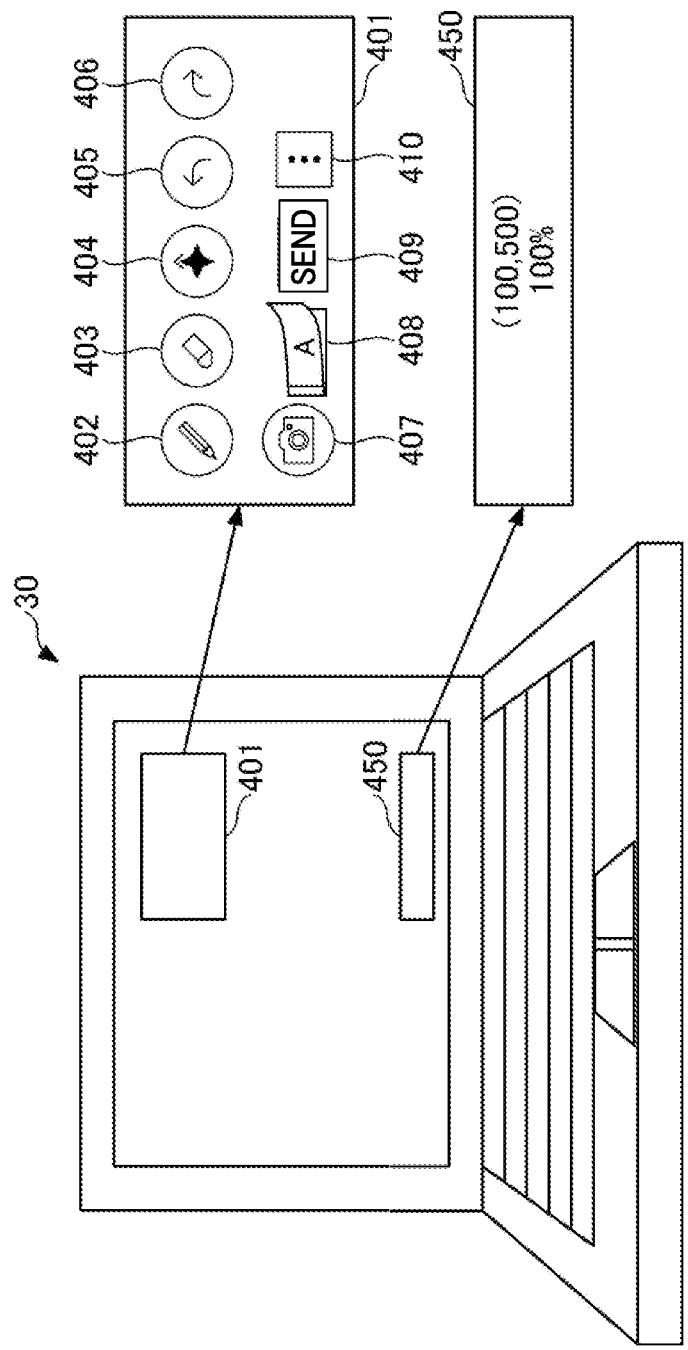
FIG. 8 is a diagram illustrating an example of a menu and an information display bar displayed by an electronic canvas application of the second terminal, according to an embodiment of the present disclosure.

FIG. 8 is a diagram illustrating an example of a menu 401 and an information display bar 450 displayed by the electronic canvas application 12 of the second terminal 30. The menu 401 includes a pen button 402, an eraser button 403, a screen shift button 404, an undo button 405, a redo button 406, a capture button 407, a character memo button 408, a business application linkage button 409, and a setting button 410. In the following, a description is given of each of these buttons.

The pen button 402 is a button that allows a user to draw handwritten information (stroke). The eraser button 403 is a button that allows a user to erase the handwritten information. The screen shift button 404 is a button for displaying an area that is not being displayed on the display 3 (the electronic canvas application 12 can theoretically have infinite size) on the display 3. The undo button 405 is a button for cancelling an action content and returning to a state where the action has not been performed. The redo button 406 is a button for redoing the action that a user has undone and returning to a state where the action has been performed. The capture button 407 is a button for capturing image data of a screen displayed by the material display application 11. The character memo button 408 is a button for displaying software key canvas and allowing a user to enter text. The business application linkage button 409 is a button for calling a cloud service (a cloud service other than the image management server 50 of the present embodiment) and/or sending the auxiliary application ID or an URL of the electronic canvas (meeting) by e-mail. The setting button 410 is a button for accepting various settings.

A user presses the capture button 407 in the menu 401 to cause the first terminal 10 to capture image data of the screen of the material display application 11. The information display bar 450 is an area for indicting a current display area of the electronic canvas using coordinates and displaying a scaling factor. The electronic canvas is generated as having scrollable wide area so that a user's thinking is not interrupted by screen switching or the like. Accordingly, the electronic canvas application 12 displays the current display area to enable a user to recognize which part he or she is viewing. The coordinate value displayed in the information display bar 450 is, for example, coordinates of the upper left corner of the display range with respect to an entire area of the electronic canvas or coordinates of the center of the display area.

<Overview of Operation>

Next, a description is given of each of an overview of generation of an electronic canvas and an overview of capturing of a screen.

Figure 9:
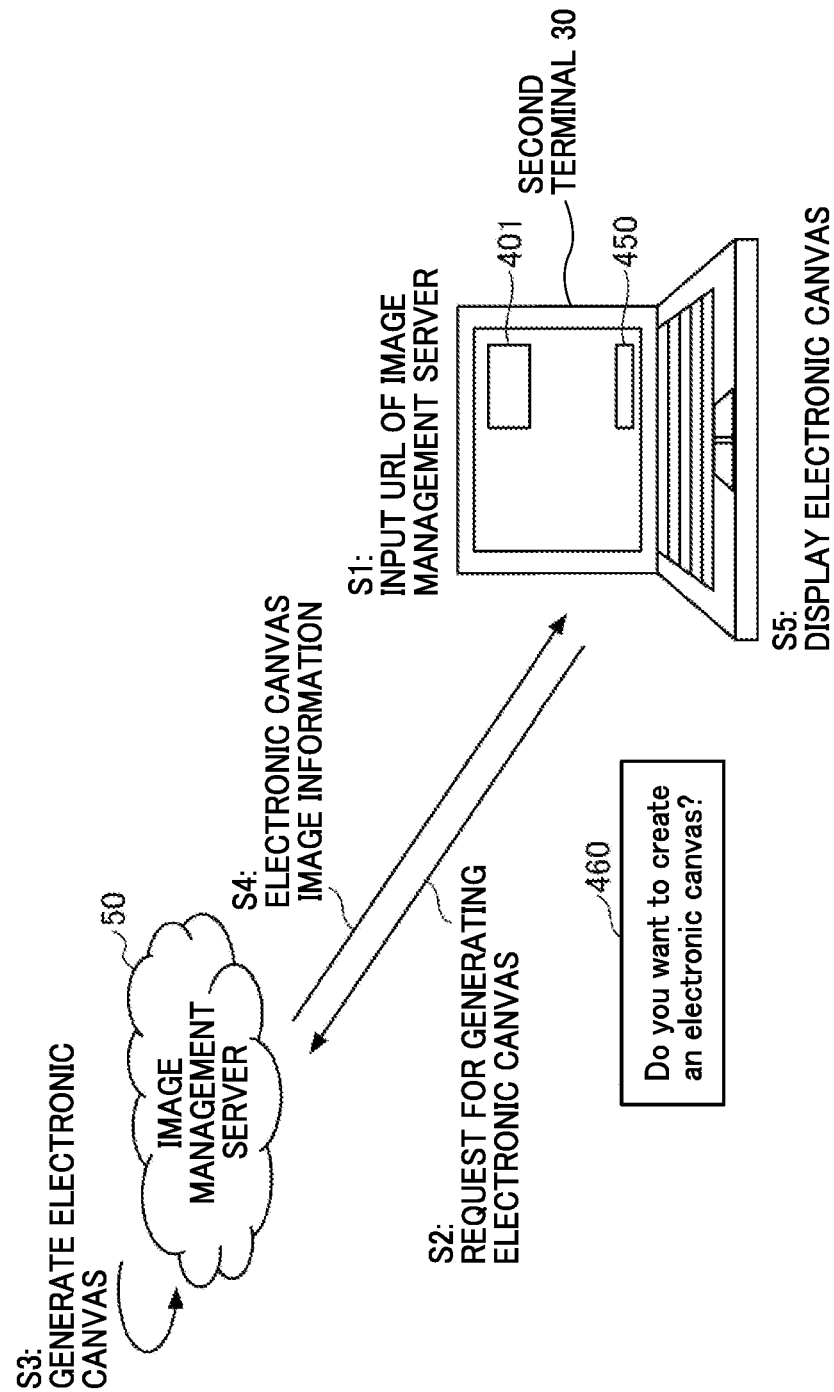
FIG. 9 is an illustration for describing an example of an overview of generation of an electronic canvas, according to an embodiment of the present disclosure.

Overview of Generation of Electronic Canvas:

FIG. 9 is an illustration for describing an example of an overview of generation of an electronic canvas.

S1: A user of the second terminal 30 causes the second terminal 30 to connect to an URL of the image management server 50. The user enters the URL of the image management server 50 obtained in advance. With this operation, the second terminal 30 displays a top page.

S2: On the top page, a button 460 including a message such as "Do you want to create an electronic canvas?" is displayed, and the user presses this button 460. When the operation receiving unit 24 of the second terminal 30 receives the pressing of the button 460, the communication unit 22 transmits a request for generation of an electronic canvas to the image management server 50.

S3: In response to receiving the electronic canvas generation request by the second communication unit 52 of the image management server 50, the canvas screen generator 55 generates an electronic canvas.

S4: The second communication unit 52 of the image management server 50 transmits screen information of the electronic canvas to the second terminal 30.

S5: The communication unit 22 of the second terminal 30 receives the screen information of the electronic canvas. When the second terminal 30 executes the screen information on the browser application 15, the electronic canvas application 12 activates. In its initial state, the electronic canvas is a white screen on which the menu 401 and the information display bar 450 are displayed.

As described, the user can generate the electronic canvas by connecting the second terminal 30 to the image management server 50.

Figure 10:
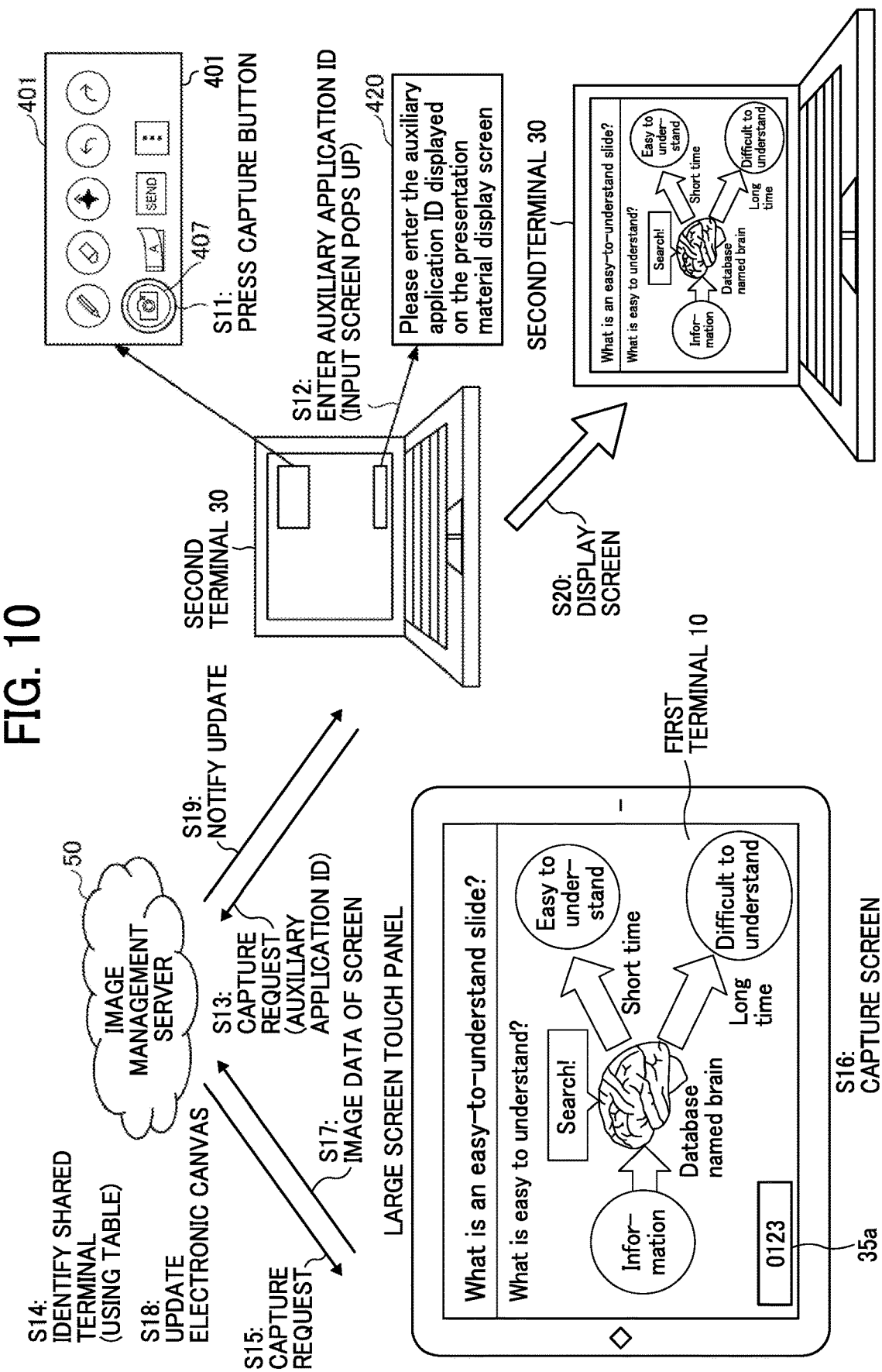
FIG. 10 is an illustration for describing an example of an overview of screen capturing, according to an embodiment of the present disclosure.

Overview of Screen Capturing:

FIG. 10 is an illustration for describing an example of an overview of screen capturing.

S11: A user who wants to cause the second terminal 30 to display a screen of the first terminal 10 presses the capture button 407 of the menu 401. The operation receiving unit 24 receives pressing of the capture button 407.

S12: In response to pressing of the capture button 407, the display control unit 21 displays an auxiliary application ID field 420 as a pop-up menu. The user confirms the auxiliary application ID displayed on the display 3 by the first terminal 10 and enters the auxiliary application ID in the auxiliary application ID field 420. The operation receiving unit 24 receives the auxiliary application ID. The user can specify the first terminal 10 by entering the auxiliary application ID.

S13: The communication unit 22 of the second terminal 30 transmits a capture request including the auxiliary application ID to the image management server 50. This capture request is transmitted based on the screen information generated by the image management server 50. In other words, the capture button 407 is generated by the canvas screen generator 55 of the image management server 50.

S14: When the second communication unit 52 of the image management server 50 receives the capture request, the image acquisition unit 54 acquires an IP address associated with the auxiliary application ID via the IP address management unit 53. Thus, the first terminal 10 is identified.

S15: The first communication unit 51 of the image management server 50 transmits the capture request to the first terminal 10 identified by the IP address.

S16: The communication unit 31 of the first terminal 10 receives the capture request, and the screen capturing unit 34 requests the OS 14 to capture a screen, to generate image data of the screen.

S17: The communication unit 31 of the first terminal 10 transmits the image data of the captured screen to the image management server 50.

S18: The first communication unit 51 of the image management server 50 receives the image data of the screen, and the canvas screen generator 55 performs an update of adding the image data to the screen information of the electronic canvas.

S19: The second communication unit 52 of the image management server 50 transmits a notification indicating the update of the electronic canvas.

S20: In response to receiving this update notification, the communication unit 22 of the second terminal 30 requests the updated screen information of the electronic canvas. With this operation, the electronic canvas application 12 of the second terminal 30 displays the same screen as the screen of the material display application 11 being displayed by the first terminal 10.

<Sequence>

Next, with reference sequence diagrams, an operation flow performed when starting the first terminal 10, an operation flow of generating an electronic canvas, and an operation flow of capturing a screen are described.

Figure 11:
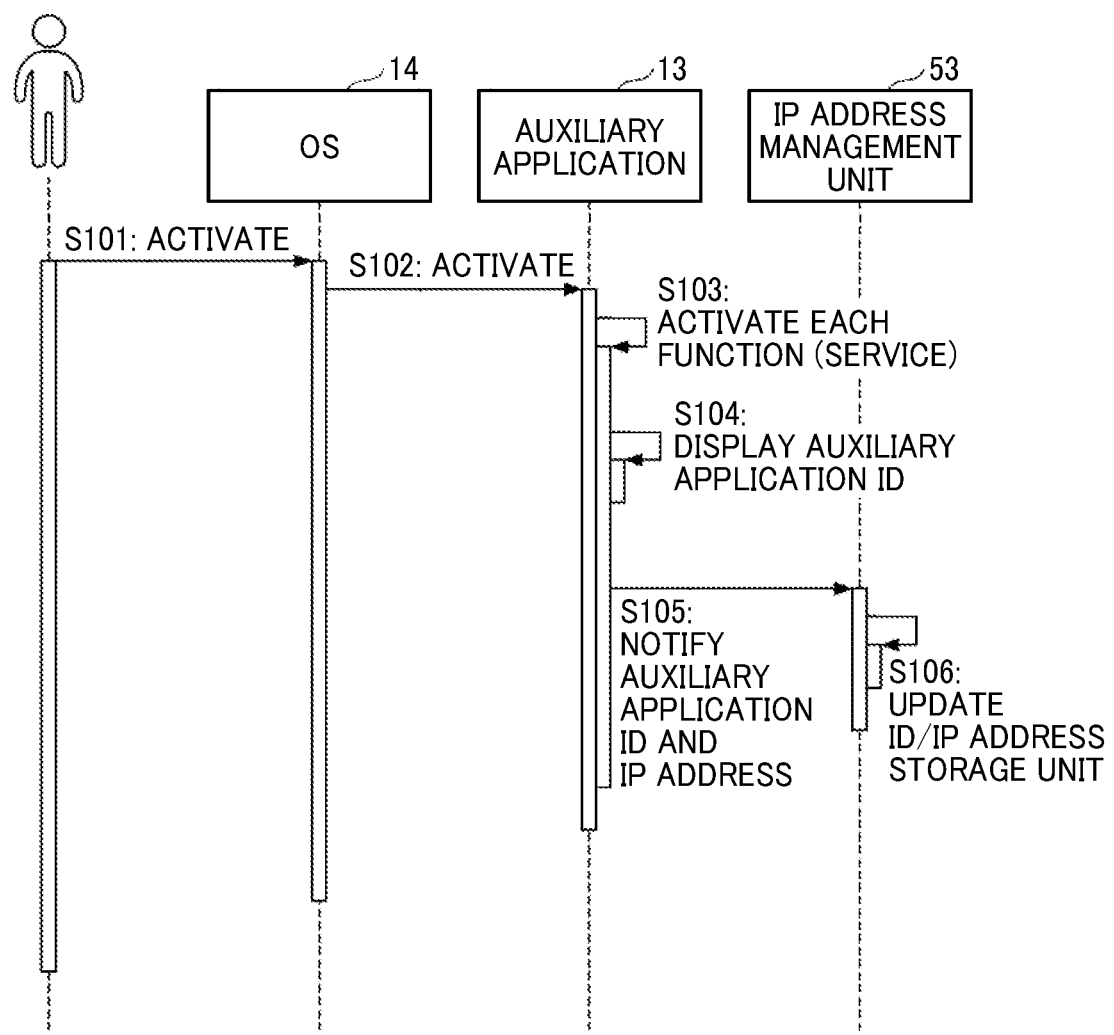
FIG. 11 is a sequence diagram illustrating an example of an operation in which the first terminal notifies the image management server of the auxiliary application ID when the first terminal is started, according to an embodiment of the present disclosure.

Operation Flow Performed when First Terminal 10 is Started:

FIG. 11 is a sequence diagram illustrating an example of an operation in which the first terminal 10 notifies the image management server 50 of the auxiliary application ID when the first terminal is started.

S101: When a user wants to use the first terminal 10, the user starts the first terminal 10. For example, the user turns on the power.

S102: In the first terminal 10, the OS 14 first starts operating. When the OS 14 starts operating, the OS 14 automatically causes the auxiliary application 13 to start operating. In another example, the OS 14 launches the auxiliary application 13 according to user operation.

S103: The auxiliary application 13 activates various functions (services) according to instructions from the OS 14.

S104: First, the ID display unit 33 acquires the auxiliary application ID 35*a* stored in the storage unit 35 and displays the auxiliary application ID on a screen (display 3).

S105: Next, the ID notification unit 32 transmits the auxiliary application ID to the image management server 50 via the communication unit 31. With this process, the image management server 50 acquires an IP address of the first terminal 10.

S106: The first communication unit 51 of the image management server 50 acquires the auxiliary application ID and the IP address of the first terminal 10. Further, the IP address management unit 53 stores the auxiliary application ID and the IP address of the first terminal 10 in association with each other in the ID/IP address storage unit 56.

As described, when the first terminal 10 is started, the auxiliary application ID and the IP address of the first terminal 10 are automatically stored in the image management server 50. In the present embodiment, the first terminal 10 is not associated with a specific electronic canvas. Accordingly, each time the second terminal 30 transmits the auxiliary application ID, a screen of the first terminal 10 is transmitted to the second terminal 30. In one example, when the power of the first terminal 10 is turned off, the ID notification unit 32 requests the image management server 50 to delete the auxiliary application ID and the IP address of the first terminal 10.

Figure 12:
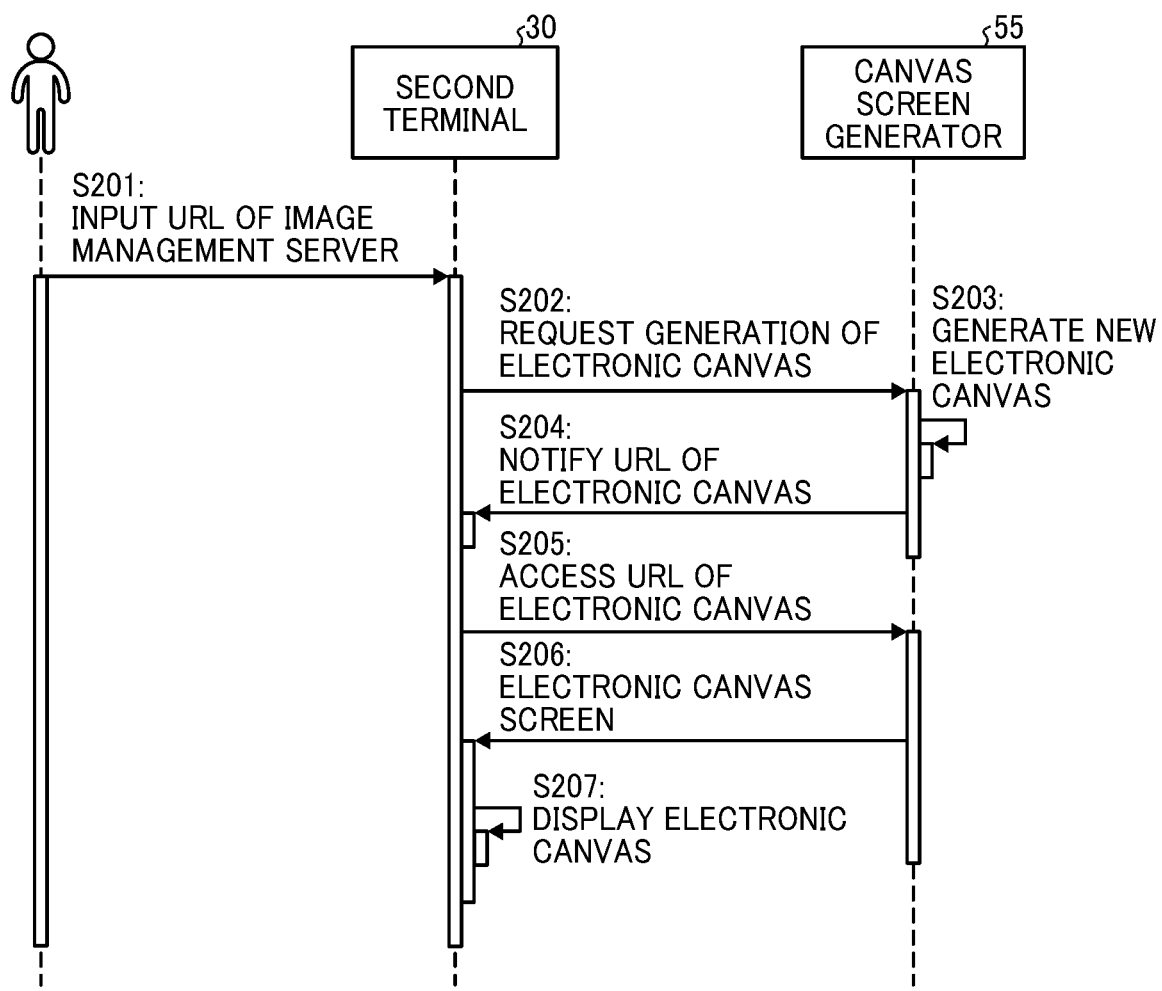
FIG. 12 is a sequence diagram illustrating an example of an operation in which the second terminal generates electronic canvas, according to an embodiment of the present disclosure.

Operation Flow of Generating Electronic Canvas:

FIG. 12 is a sequence diagram illustrating an example of an operation in which the second terminal 30 generates electronic canvas.

S201: A user of the second terminal 30 operates the second terminal 30 to enter an URL of the image management server 50 to the second terminal 30. The user knows the URL in advance. The operation receiving unit 24 receives the URL of the image management server 50.

S202: When the operation receiving unit 24 receives the user's operation of pressing the button 460 illustrated in FIG. 9, the communication unit 22 of the second terminal 30 transmits a request for generation of an electronic canvas to the image management server 50.

S203: In response to receiving this electronic canvas generation request by the second communication unit 52 of the image management server 50, the canvas screen generator 55 generates an electronic canvas (screen information).

The electronic canvas is generated at a specific URL so that one or more second terminals 30 can access the electronic canvas. One URL is associated with one electronic canvas. In other words, different URLs are assigned to different electronic canvases, respectively. The following is an example of the URL of the electronic canvas.

http://server/kaigi/k001

S204: The second communication unit 52 of the image management server 50 transmits the URL of the electronic canvas to the second terminal 30.

S205: The communication unit 22 of the second terminal 30 receives the URL of the electronic canvas and accesses (connects) this URL.

S206: When the communication unit 22 of the second terminal 30 accesses the URL of the electronic canvas, the second communication unit 52 of the image management server 50 transmits the screen information of the electronic canvas generated by the canvas screen generator 55 to the second terminal 30. The communication unit 22 of the second terminal 30 receives the screen information of the electronic canvas.

S207: When the second terminal 30 executes display processing of the screen information on the browser application 15, the electronic canvas application 12 starts operating, and the display control unit 21 displays the electronic canvas on the display 3. In its initial state, the electronic canvas is a white screen on which the menu 401 and the information display bar 450 are displayed.

Since one URL corresponds to one electronic canvas, any second terminal 30 can display the same electronic canvas by accessing the URL of the electronic canvas. When data such has handwriting is written on the electronic canvas of the second terminal 30, the communication unit 22 of the second terminal 30 transmits a notification indicating the change to the canvas screen generator 55 via the second communication unit 52. In response to receiving this notification, the canvas screen generator 55 updates the screen information. The canvas screen generator 55 sends a notification indicating that there was a change to one or more other second terminals 30. In another example, the second terminal 30 periodically accesses the URL of the electronic canvas to update the electronic canvas.

Figure 13:
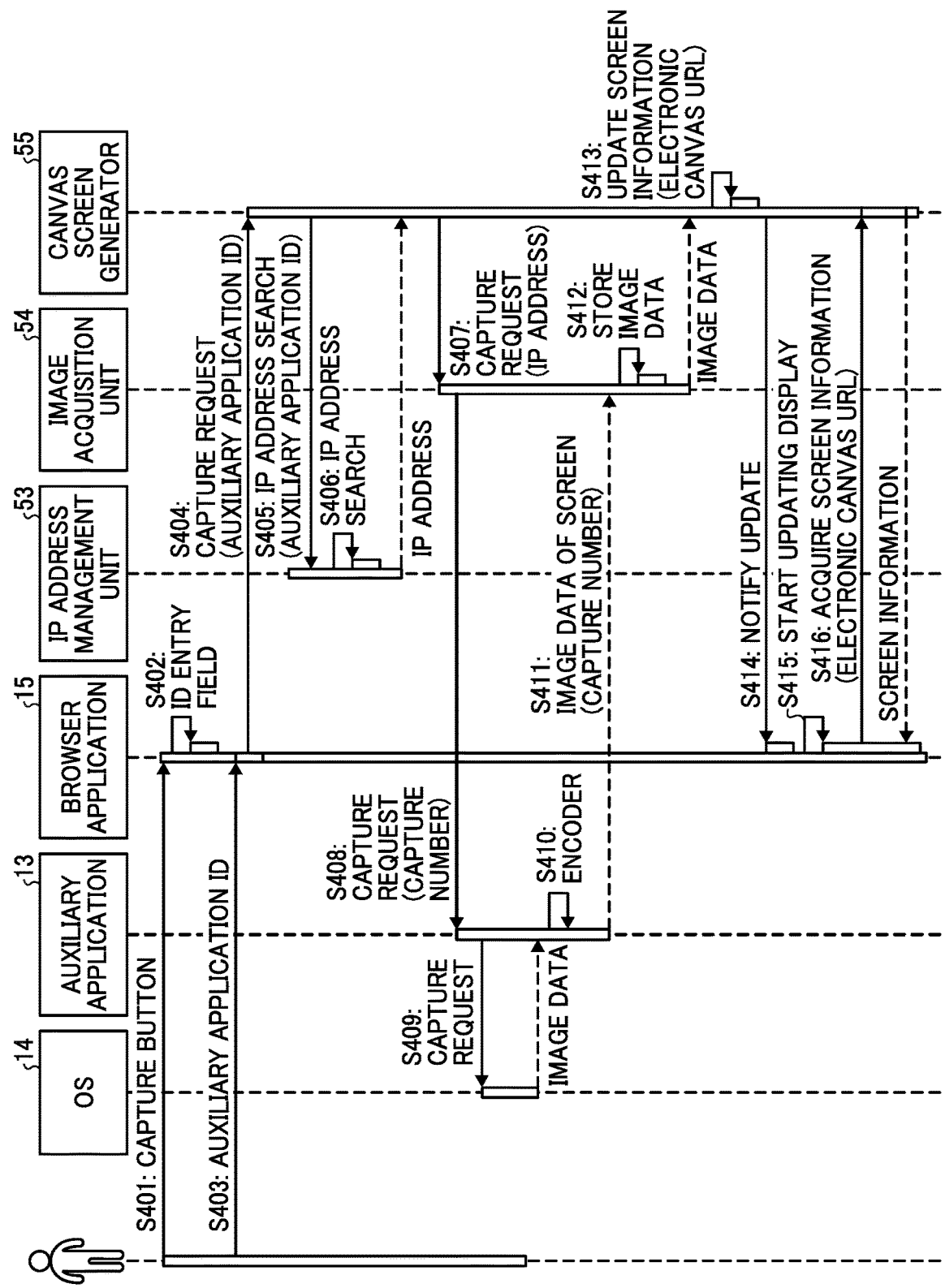
FIG. 13 is a sequence diagram illustrating an example of an operation in which the first terminal captures a screen and the second terminal displays image data of a screen of a material display application, according to an embodiment of the present disclosure.

Operation Flow of Screen Capturing:

FIG. 13 is a sequence diagram illustrating an example of an operation in which the first terminal 10 captures a screen and the second terminal 30 displays image data of a screen of the material display application 11.

S401: When a user wants to cause the second terminal 30 to display a screen of the first terminal 10, the user presses the capture button 407 of the menu 401. The operation receiving unit 24 receives the pressing of the capture button 407.

S402: In response to the pressing of the capture button 407, the display control unit 21 displays the auxiliary application ID field 420 as a pop-up menu.

S403: The user confirms the auxiliary application ID 35a displayed on the display 3 by the first terminal 10, and enters the auxiliary application ID in the auxiliary application ID field 420. The operation receiving unit 24 receives the auxiliary application ID.

S404: The communication unit 22 of the second terminal 30 transmits a capture request including the auxiliary application ID to the image management server 50. The transmission destination is the URL of the electronic canvas. In one example, the display control unit 21 displays a message such as "Capture in progress" until receiving image data of a screen of the material display application 11.

S405: When the second communication unit 52 of the image management server 50 receives the capture request, the canvas screen generator 55 sends the auxiliary application ID to the IP address management unit 53 to make an inquiry about the IP address of the first terminal 10.

S406: The IP address management unit 53 acquires an IP address that is associated with the auxiliary application ID from the ID/IP address storage unit 56. The IP address is sent to the canvas screen generator 55. Thus, the first terminal 10 is identified.

S407: The canvas screen generator 55 sends the capture request together with the IP address of the first terminal 10 to the image acquisition unit 54.

S408: The image acquisition unit 54 assigns a unique capture number and sends the capture number and the capture request to the first terminal 10 identified by the IP address via the first communication unit 51 of the image management server 50. The capture number is identification information for identifying the electronic canvas to which image data of a screen is to be sent back. For this reason, the image acquisition unit 54 associates the URL of the electronic canvas with the capture number. This enables the image acquisition unit 54 to send image data of a screen to the electronic canvas to which the second terminal 30 that sent the capture request is connecting, even in a case where a plurality of electronic canvases are generated.

S409: The communication unit 31 of the first terminal 10 receives the capture request, and the screen capturing unit 34 requests the OS 14 to capture a screen. Thus, the screen capturing unit 34 acquires image data of the screen (document displayed by the material display application 11).

S410: The screen capturing unit 34 compresses the image data of the screen. This enables to reduce the size of the image data. In a case where the size of the image data is small, compression can be omitted.

S411: The communication unit 31 of the first terminal 10 transmits the image data of the screen and the capture number to the image management server 50.

S412: The first communication unit 51 of the image management server 50 receives the image data of the screen. Further, the image acquisition unit 54 stores the image data of the screen in the storage device of the image management server 50. The image acquisition unit 54 uses the capture number to identify the electronic canvas (canvas screen generator 55) that requested the image data of the screen, and sends the image data of the screen to the identified canvas screen generator 55.

S413: Next, the canvas screen generator 55 adds the image data of the screen to the screen information of the electronic canvas to update the screen information. In other words, the screen information already generated by the canvas screen generator 55 is updated using the image data of the screen. The canvas screen generator 55 performs the process of adding the image data of the screen to the screen information of the electronic canvas identified by the URL or the like to which the capture request is sent in step S404. Thus, the screen information of the screen on which the capture button 407 was displayed in step S401 is updated. In other words, the screen information corresponding to the URL of step S205 in FIG. 12 is updated, which corresponds to the screen on which the capture button 407 was displayed in step S401.

S414: In response to the update of the screen information, the canvas screen generator 55 of the image management server 50 sends a notification indicating the update of the electronic canvas to the browser application 15 (communication unit 22) of the second terminal 30 via the second communication unit 52.

S415: In response to receiving the update notification, the communication unit 22 of the second terminal 30 instructs the display control unit 21 to update the electronic canvas.

S416: The display control unit 21 sends a request for the screen information of the updated electronic canvas to the URL of the electronic canvas via the communication unit 22. Thus, the display control unit 21 displays the screen of the material display application 11 displayed by the first terminal 10.

With reference to the sequence diagram of FIG. 13, the above description is given assuming that the auxiliary application ID is entered manually by a user every time. In another example, such manual entry by each time can be omitted by configuring a setting in advance, since the auxiliary application ID seldom changes.

Further, the first terminal 10 can display two or more material display applications 11. In this case, the auxiliary applications 13 as many as the material display applications 11 are activated. When a user enters the auxiliary application ID to the second terminal 30, the second terminal 30 can display a desired screen among the screens displayed by the plurality of material display applications 11.

As described above, according to the information sharing system of the present embodiment, the first terminal 10 and the second terminal 30 connect to the image management server 50 and thereby the second terminal 30 acquires a screen being displayed by the first terminal 10. Further, the second terminal 30 can acquire a screen being displayed by the first terminal 10, without necessity of installing a special application in the second terminal. A user can share the screen being displayed by the first terminal 10 by entering the auxiliary application ID. In the information sharing system according to the present embodiment, since an electronic canvas is generated in response to a user's instruction, the association between the electronic canvas and the first terminal 10 is not fixed. Accordingly, the user can cause the electronic canvas to display a screen of a desired first terminal 10 by entering the auxiliary application ID. In other word, since screens of the different first terminals 10 can be displayed on the electronic canvas, the electronic canvas can be used like a memo of the user.

If second terminal 30 does not receive an instruction from first terminal 10, a user of second terminal 30 is not able to decide a screen in which the user desires from all screens displayed in a conference (or meeting or the like). Even if second terminal 30 is able acquire a screen from first terminal 10, the user would have to look for the screen which the user desires from all screens displayed in the conference. In accordance with the present application, however, the user can confirm only the screen required by the user at any time, because second terminal 30 requests the screen when receiving an instruction to do so from the user. Also, since second terminal 30 displays only the screens which are acquired when receiving an instruction from the user, second terminal 30 is able to display only the screens desired by the use at any time. That is, if second terminal 30 receives a plurality of instructions, second terminal 30 displays a plurality of corresponding screens. Thus, an apparatus in accordance with the present application improves a user's experience by allowing the user to confirm and view desired screens during a conference (or meeting or the like).

<Variation>

In the present embodiment, as described, a screen is captured in response to a capture request from the image management server 50 to the first terminal 10. In another example, the first terminal 10 captures a screen periodically or in response to detection of a change of the screen and uploads image data of the screen to the image management server 50. In this case, the image acquisition unit 54 stores the image data of the screen in association with the IP address of the first terminal 10. Further, in response to a request from the second terminal 30, the image acquisition unit 54 transmits the latest one of the stored image data of the screen.

Second Embodiment

In the present embodiment, a description is given of the information sharing system in which the first terminal 10 generates an electronic canvas. Since the first terminal 10 generates an electronic canvas, the first terminal 10 and an electronic canvas are associated with each other at the time of startup of the first terminal 10. On the other hand, a user of the second terminal 30 does not know to which URL the user should instruct the second terminal to connect to use the electronic canvas generated by the first terminal 10. For this reason, the first terminal 10 displays an URL of the generated electronic canvas. The user enters this URL to the second terminal 30 to specify the electronic canvas generated by the first terminal 10. This enables the second terminal 30 to acquire mage data of a screen of the material display application 11.

<Functions>

Figure 14:
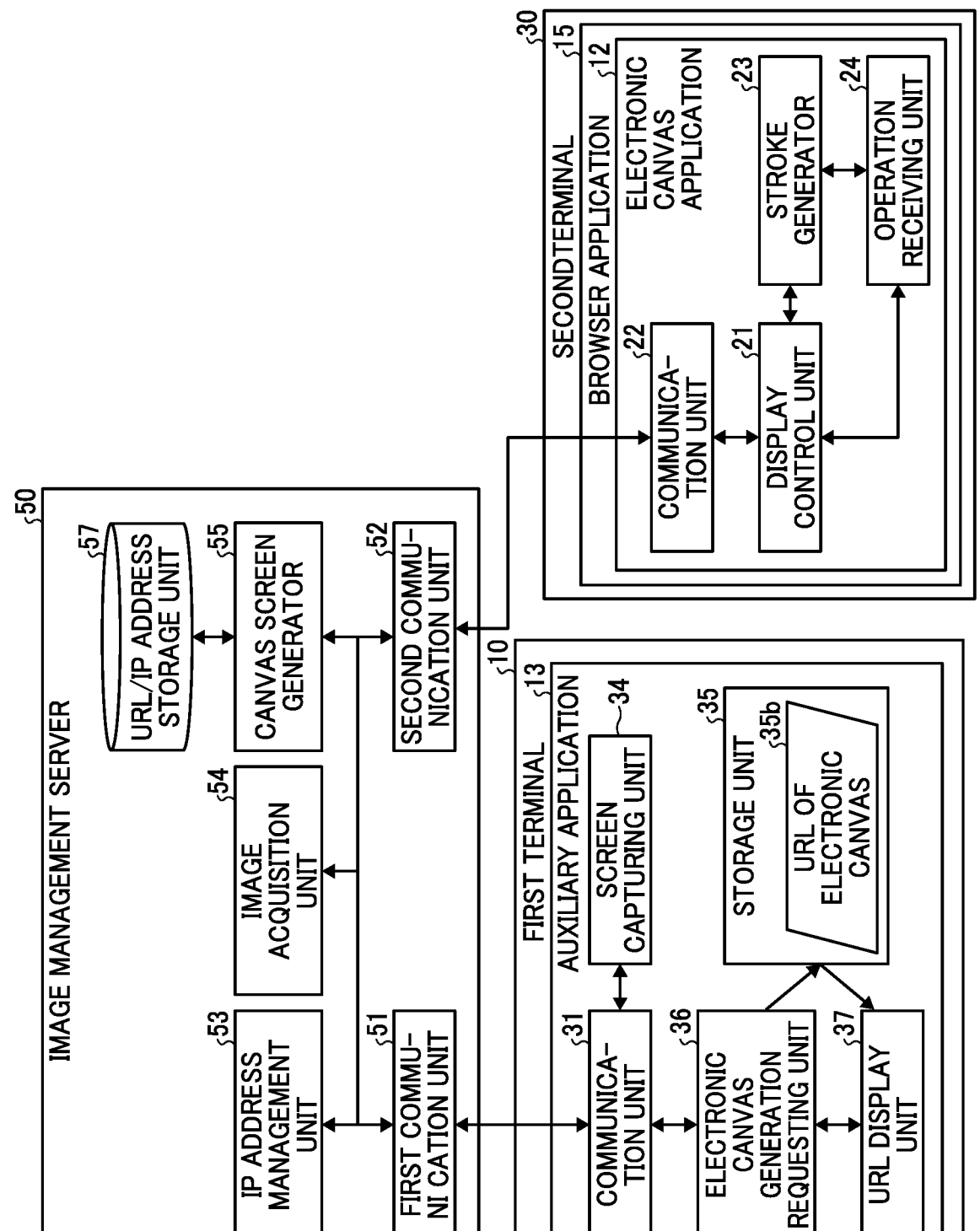
FIG. 14 is a block diagram illustrating an example of a functional configuration of each of the first terminal, the second terminal, and the image management server, according to an embodiment of the present disclosure.

FIG. 14 is a block diagram illustrating an example of a functional configuration of each of the first terminal 10, the second terminal 30, and the image management server 50, according to the present embodiment. In the following description of FIG. 14, the differences from FIG. 6 are focused.

Auxiliary Application 13:

The auxiliary application 13 includes the communication unit 31, an electronic canvas generation requesting unit 36, a URL display unit 37, and the screen capturing unit 34. In other words, the auxiliary application 13 additionally includes the electronic canvas generation requesting unit 36 and the URL display unit 37.

The electronic canvas generation requesting unit 36 requests the image management server 50 to generate an electronic canvas, for example, at the time of startup of the first terminal 10 or according to an operation by a user. The electronic canvas generation requesting unit 36 acquires an URL of the generated electronic canvas from the image management server 50. Further, the electronic canvas generation requesting unit 36 stores the URL 35b of the electronic canvas in the storage unit 35. The URL display unit 37 causes the display 3 to display the URL 35b of the electronic canvas.

Image Management Server 50:

The image management server 50 according to the present embodiment includes a URL/IP address storage unit 57 instead of the ID/IP address storage unit 56 of the first embodiment. In addition, functions implemented by the canvas screen generator 55 are different from those of the first embodiment. The canvas screen generator 55 according to the present embodiment stores the URL of the electronic canvas generated in response to the request from the first terminal 10 and the IP address of the first terminal 10 in the URL/IP address storage unit 57 in association with each other.

TABLE 2

| URL of Electronic Canvas | IP Address (First terminal) |
|---|---|
| http://server/kaigi/k001 | 10.60.100.100 |
| http://server/kaigi/k002 | 10.60.101.101 |

Table 2 is an example of information stored in the URL/IP address storage unit 57. In the URL/IP address storage unit 57, URLs of the electronic canvases and IP addresses of the first terminals 10 are registered in association with each other. This enables the image management server 50 to identify the IP address of the first terminal 10 based on the URL of the electronic canvas.

<Overview of Operation>

Next, a description is given of each of an overview of generation of an electronic canvas and an overview of capturing of a screen.

Figure 15:
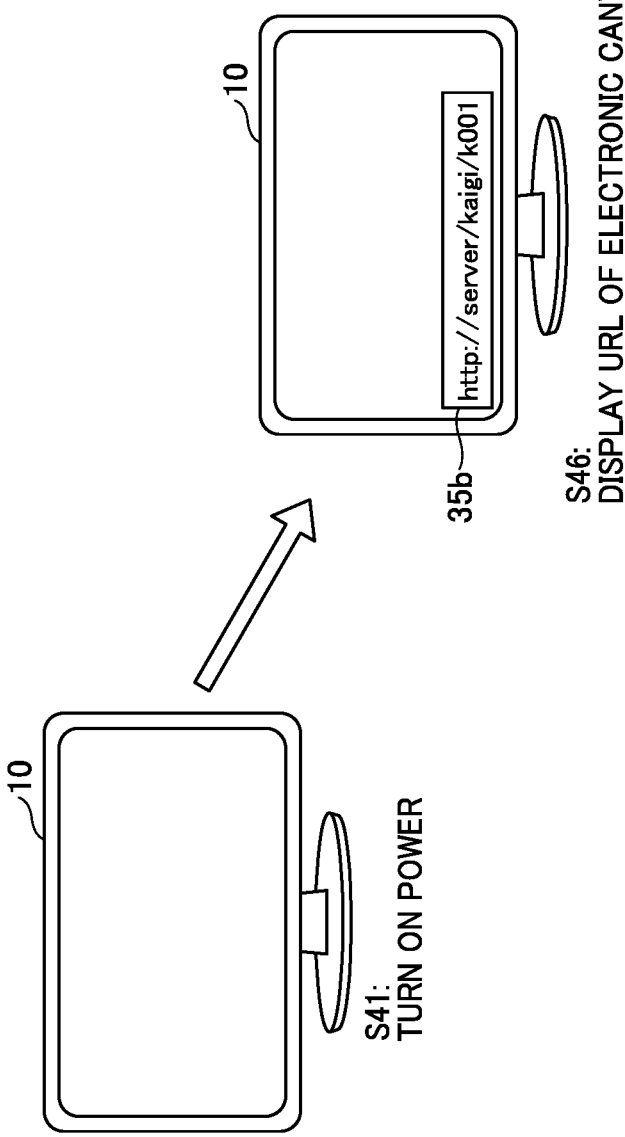
FIG. 15 is an illustration for describing an example of an overview of generation of an electronic canvas, according to an embodiment of the present disclosure.

Overview of Generation of Electronic Canvas:

FIG. 15 is an illustration for describing an example of an overview of generation of an electronic canvas, according to the present embodiment.

S41: The user turns on the power of the first terminal 10.

S42: When the first terminal 10 starts operating, the first terminal 10 transmits an electronic canvas generation request to the image management server 50. In the auxiliary application 13, an URL of the image management server 50 is set in advance. Together with the electronic canvas generation request, the IP address of the first terminal 10 is also transmitted.

S43: The image management server 50 receives the electronic canvas generation request, and generates an electronic canvas at an URL generated by a generation process determined in advance.

S44: The image management server 50 registers the URL of the electronic canvas and the IP address of the first terminal 10 in the URL/IP address storage unit 57 in association with each other.

S45: The image management server 50 transmits the URL of the electronic canvas to the first terminal 10.

S46: In response to receiving the URL of the electronic canvas, the first terminal 10 stores the URL in the storage unit 35. Further, the auxiliary application 13 causes the display 3 to display the URL of the electronic canvas.

Since the URL is displayed in this manner, a user of the second terminal 30 can causes the second terminal 30 to access the electronic canvas and display the screen of the material display application 11.

Figure 16:
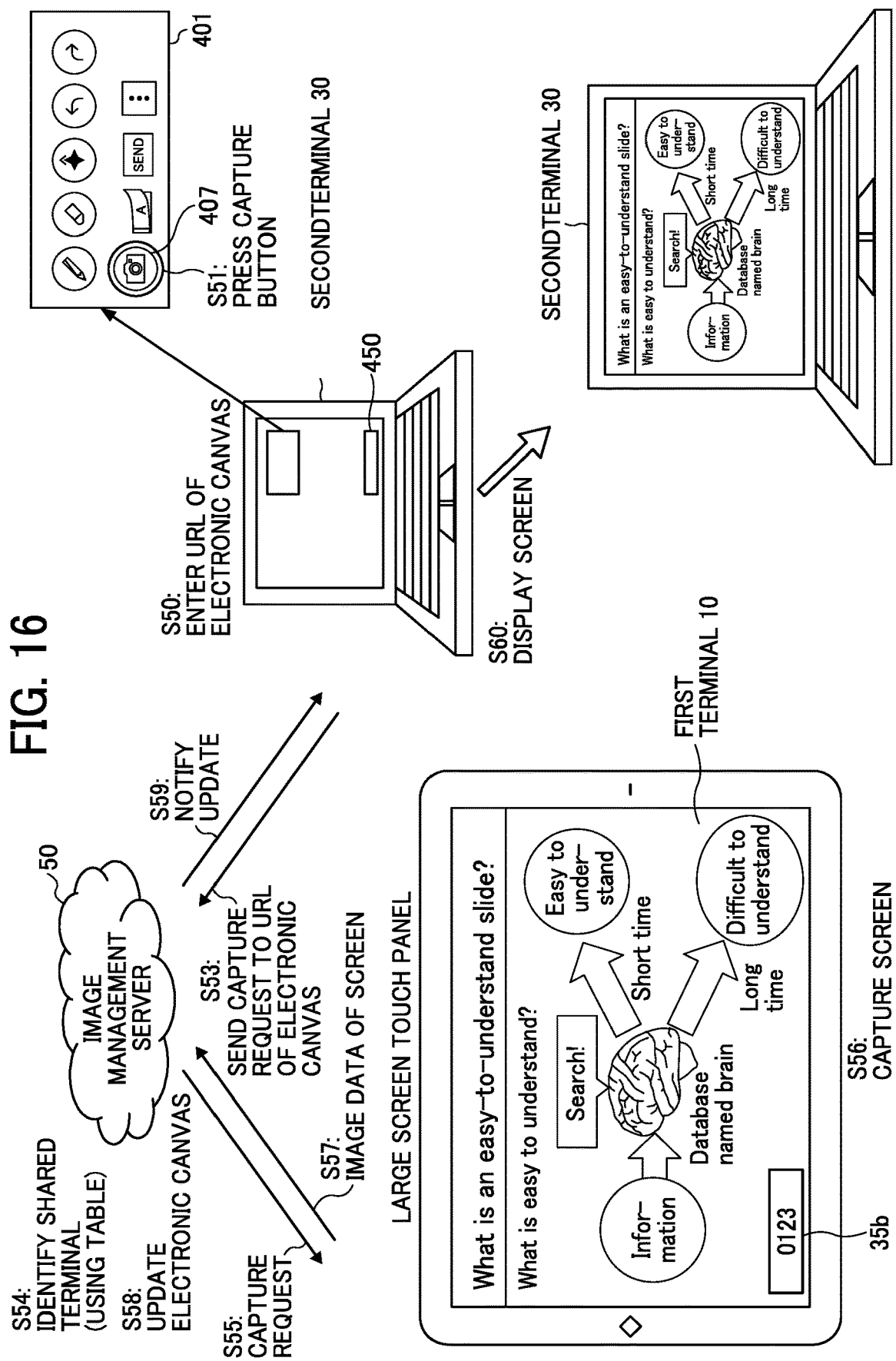
FIG. 16 is an illustration for describing an example of an overview of screen capturing, according to an embodiment of the present disclosure.

Overview of Screen Capturing:

FIG. 16 is an illustration for describing an example of an overview of screen capturing according to the present embodiment.

S50: First, the user enters the URL of the electronic canvas displayed by the first terminal 10 into the second terminal 30. As a result, firstly, an electronic canvas in the initial state (or an electronic canvas on which another user draws characters or figures by hand or to which image data of the screen is added) is displayed on the second terminal 30.

S51: Next, when the user wants to cause the second terminal 30 to display a screen of the first terminal 10, the user presses the capture button 407 of the menu 401. The operation receiving unit 24 receives the pressing of the capture button 407. Since the URL of the electronic canvas has been input, in the present embodiment, the auxiliary application ID field 420 is not displayed.

S53: The communication unit 22 of the second terminal 30 transmits a capture request to the URL of the electronic canvas.

S54: When the second communication unit 52 of the image management server 50 receives the capture request, the canvas screen generator 55 acquires the IP address associated with the URL of the electronic canvas from the URL/IP address storage unit 57. Thus, the first terminal 10 is identified.

S55: The first communication unit 51 of the image management server 50 transmits the capture request to the first terminal 10 identified by the IP address.

S56: The communication unit 31 of the first terminal 10 receives the capture request, and the screen capturing unit 34 requests the OS 14 to capture a screen. Thus, the screen capturing unit 34 generates image data of the screen (document displayed by the material display application 11).

S57: The communication unit 31 of the first terminal 10 transmits the image data of the screen to the image management server 50.

S58: The first communication unit 51 of the image management server 50 receives the image data of the screen, and the canvas screen generator 55 performs an update of adding the image data to the screen information of the electronic canvas.

S59: The second communication unit 52 of the image management server 50 transmits a notification indicating the update of the electronic canvas.

S60: In response to receiving this update notification, the communication unit 22 of the second terminal 30 requests the updated screen information of the electronic canvas. Accordingly, the electronic canvas application 12 can display the screen of the material display application 11 being displayed by the first terminal 10.

<Sequence>

Next, with reference sequence diagrams, an operation flow performed when starting the first terminal 10, and an operation flow of capturing a screen are described.

Operation Flow Performed when First Terminal 10 is Started

Figure 17:
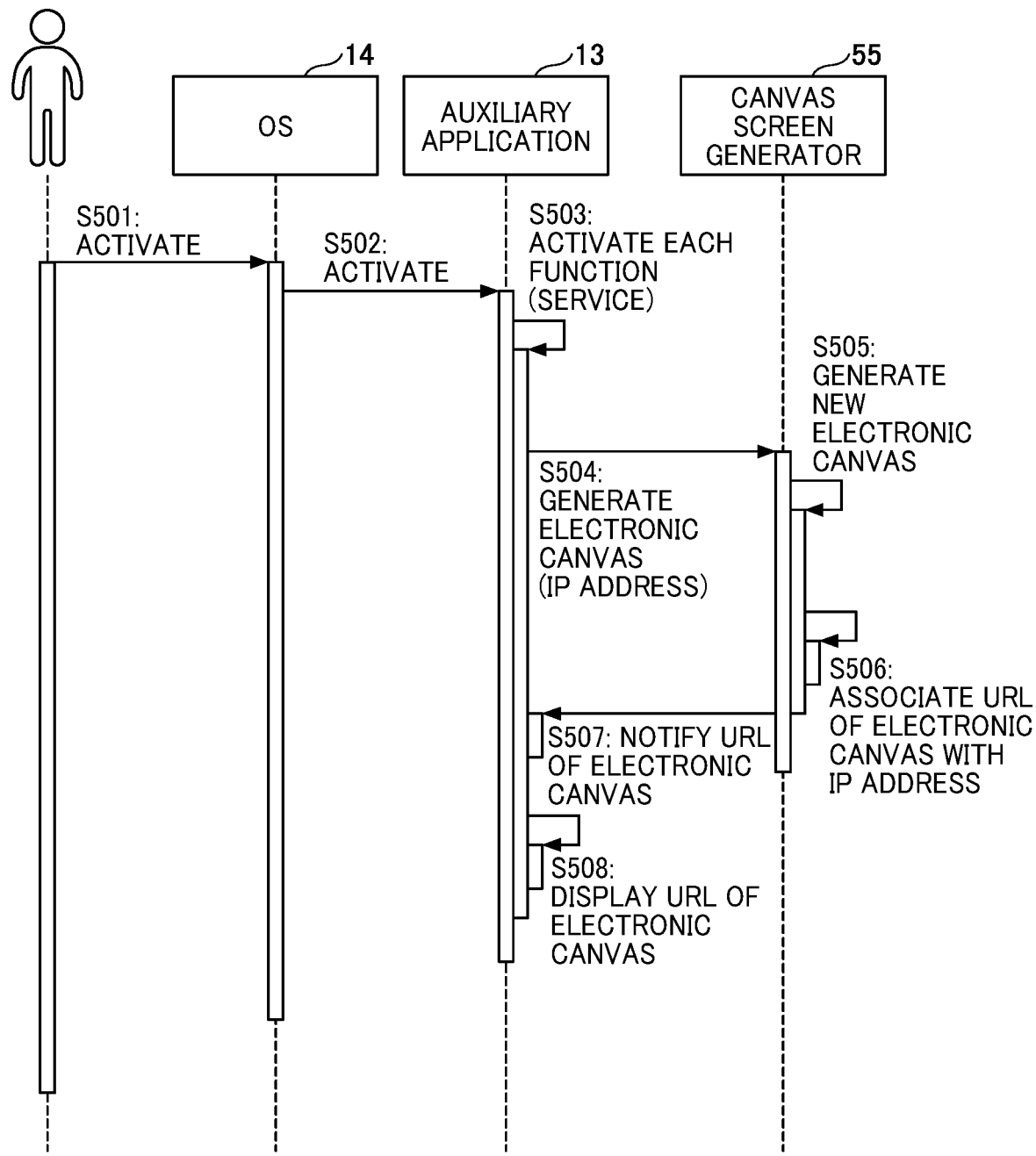
FIG. 17 is a sequence diagram illustrating an example of an operation in which the first terminal registers an URL of the electronic canvas and an IP address of the first terminal in association with each other when the first terminal is started, according to an embodiment of the present disclosure.

FIG. 17 is a sequence diagram illustrating an example of an operation in which the first terminal 10 registers an URL of an electronic canvas and an IP address of the first terminal 10 in association with each other when the first terminal is activated.

S501: When a user wants to use the first terminal 10, the user starts the first terminal 10. For example, the user turns on the power.

S502: In the first terminal 10, the OS 14 first starts operating. When the OS 14 starts operating, the OS 14 automatically causes the auxiliary application 13 to start operating. In another example, the user launches the auxiliary application 13.

S503: The auxiliary application 13 activates various functions (services) according to instructions from the OS 14.

S504: First, the electronic canvas generation requesting unit 36 transmits, to the image management server 50, an electronic canvas generation request together with the IP address of the first terminal 10.

S505: The first communication unit 51 of the image management server 50 receives the electronic canvas generation request, and the canvas screen generator 55 generates a new electronic canvas in association with an URL. It is preferable that this URL does not overlap any URL generated in the past. In another example, since an electronic canvas is wide, the URL can be the same as any URL generated in the past.

S506: The canvas screen generator 55 registers the URL of the electronic canvas and the IP address of the first terminal 10 in association with each other in the URL/IP address storage unit 57.

S507: The first communication unit 51 of the image management server 50 transmits the URL of the electronic canvas to the auxiliary application 13 of the first terminal 10.

S508: The communication unit 31 of the first terminal 10 receives the URL of the electronic canvas, and the electronic canvas generation requesting unit 36 causes the storage unit 35 to store the URL 35b of the electronic canvas. The URL display unit 37 causes the display 3 to display the URL 35b of the electronic canvas.

As described with reference to the sequence diagram of FIG. 17, when the first terminal 10 is started, the first terminal 10 automatically generates the electronic canvas and displays the URL of the electronic canvas. This enables a user to connect to the electronic canvas by entering this URL. In the present embodiment, when the first terminal 10 starts operating, the URL of the electronic canvas and the first terminal 10 are associated with each other. Accordingly, when this URL is specified, the second terminal 30 can share the screen of the first terminal 10. In one example, when the power of the first terminal 10 is turned off, the electronic canvas generation requesting unit 36 requests the image management server 50 to delete the URL of the electronic canvas and the IP address of the first terminal 10.

Figure 18:
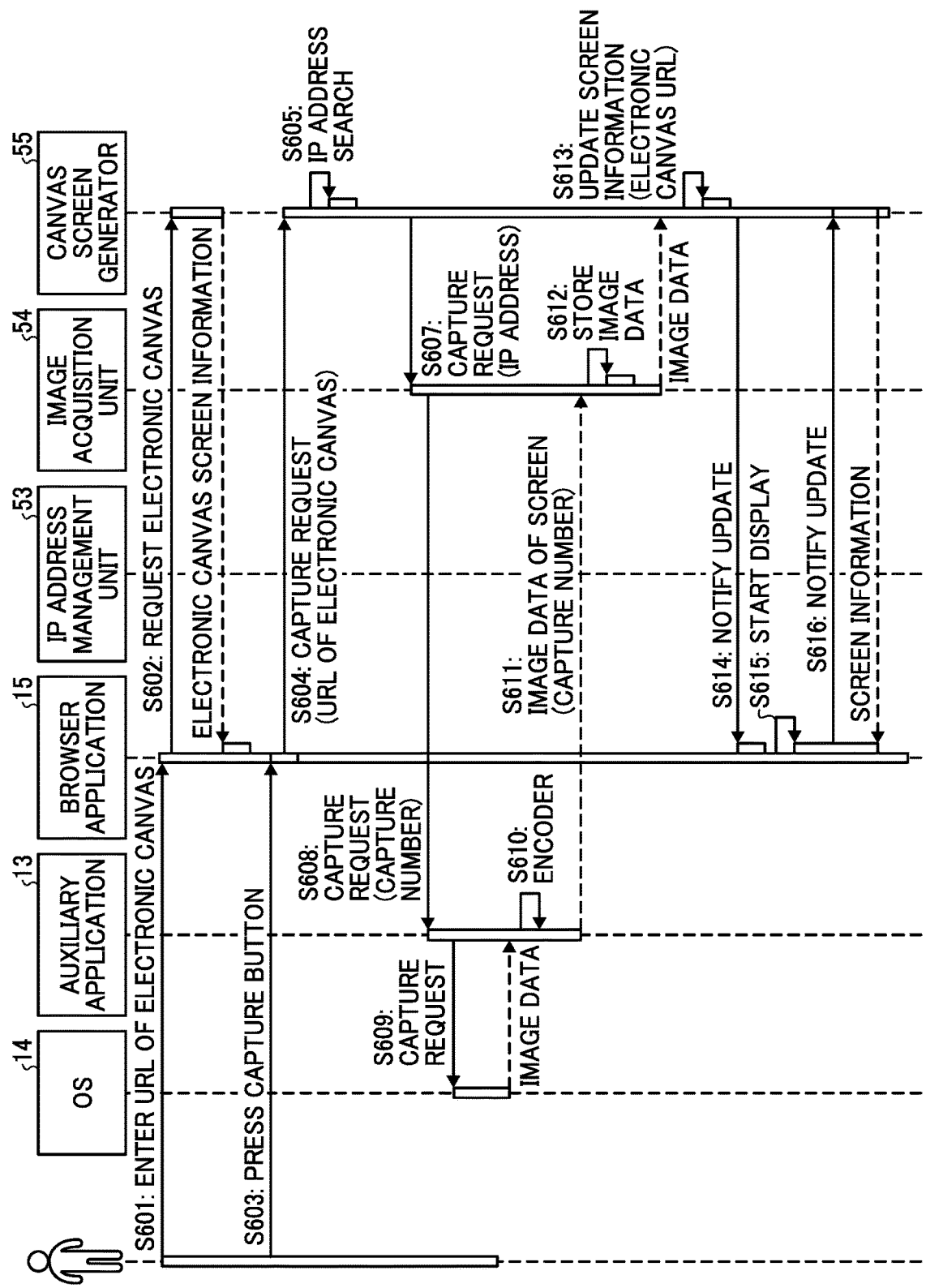
FIG. 18 is a sequence diagram illustrating an example of an operation in which the first terminal captures a screen and the second terminal displays image data of a screen of a material display application, according to an embodiment of the present disclosure.

Operation Flow of Screen Capturing:

FIG. 18 is a sequence diagram illustrating an example of an operation in which the first terminal 10 captures a screen and the second terminal 30 displays image data of a screen of the material display application 11. In the following description of FIG. 18, the differences from FIG. 13 are focused.

S601: A user who wants to cause the second terminal 30 to display a screen of the first terminal 10 using an electronic canvas generated by the first terminal 10 enters the URL 35b of the electronic canvas being displayed by the first terminal 10 to the second terminal 30.

S602: The communication unit 22 of the second terminal 30 connects to the URL 35b of the electronic canvas. As a result, screen information of the electronic canvas is transmitted to the second terminal 30. The second terminal 30 executes the screen information, and thereby the electronic canvas application 12 starts operating.

S603: Next, in order to cause the electronic canvas application 12 to display the screen of the first terminal 10, the user presses the capture button 407 of the menu 401. The operation receiving unit 24 receives the pressing of the capture button 407.

S604: The communication unit 22 of the second terminal 30 transmits a capture request to the image management server 50 while specifying the URL of the electronic canvas. In one example, the display control unit 21 displays a message such as "Capture in progress" until receiving image data of a screen of the material display application 11.

S605: When the second communication unit 52 of the image management server 50 receives the capture request, the canvas screen generator 55 acquires the IP address of the first terminal 10 associated with the URL of the electronic canvas from the URL/IP address storage unit 57.

S607: The canvas screen generator 55 sends the capture request together with the IP address of the first terminal 10 to the image acquisition unit 54. The subsequent steps can be the same as the steps S408 to S416 of FIG. 13.

In a case where the first terminal 10 generates the electronic canvas as described, it is required to specify the electronic canvas in order to acquire the screen of the material display application 11. In the present embodiment, the first terminal 10 displays the URL of the electronic canvas. This enables the second terminal 30 to access the electronic canvas.

As described above, according the information sharing system of the present embodiment, the first terminal 10 and the second terminal 30 connect to the image management server 50 and thereby the second terminal 30 acquires a screen being displayed by the first terminal 10. A user can share the screen being displayed by the first terminal 10 by entering an URL of an electronic canvas. In the information sharing system according to the present embodiment, the first terminal 10 generates an electronic canvas. Accordingly, the relation between the electronic canvas and the first terminal 10 is fixed, users who want to display the screen of the first terminal 10 on the second terminal 30 uses the same electronic canvas. Therefore, each user can write information on the same electronic canvas. For example, this enables plural users to write contents that are discussed while viewing a large screen of the first terminal 10 on the electronic canvas and share the electronic canvas to which the discussed contents are added.

As described in the first embodiment, also in the present embodiment, the first terminal 10 can capture a screen periodically or in response to detection of a change of the screen and upload image data of the screen to the image management server 50 in advance.

Third Embodiment

In any of the first and second embodiments, the second terminal 30 can continuously display a preview of a screen of the first terminal 10. When the user presses the capture button 407, the second terminal 30 copies image data of the previewed screen to the electronic canvas and displays the copied image data.

Figure 19:
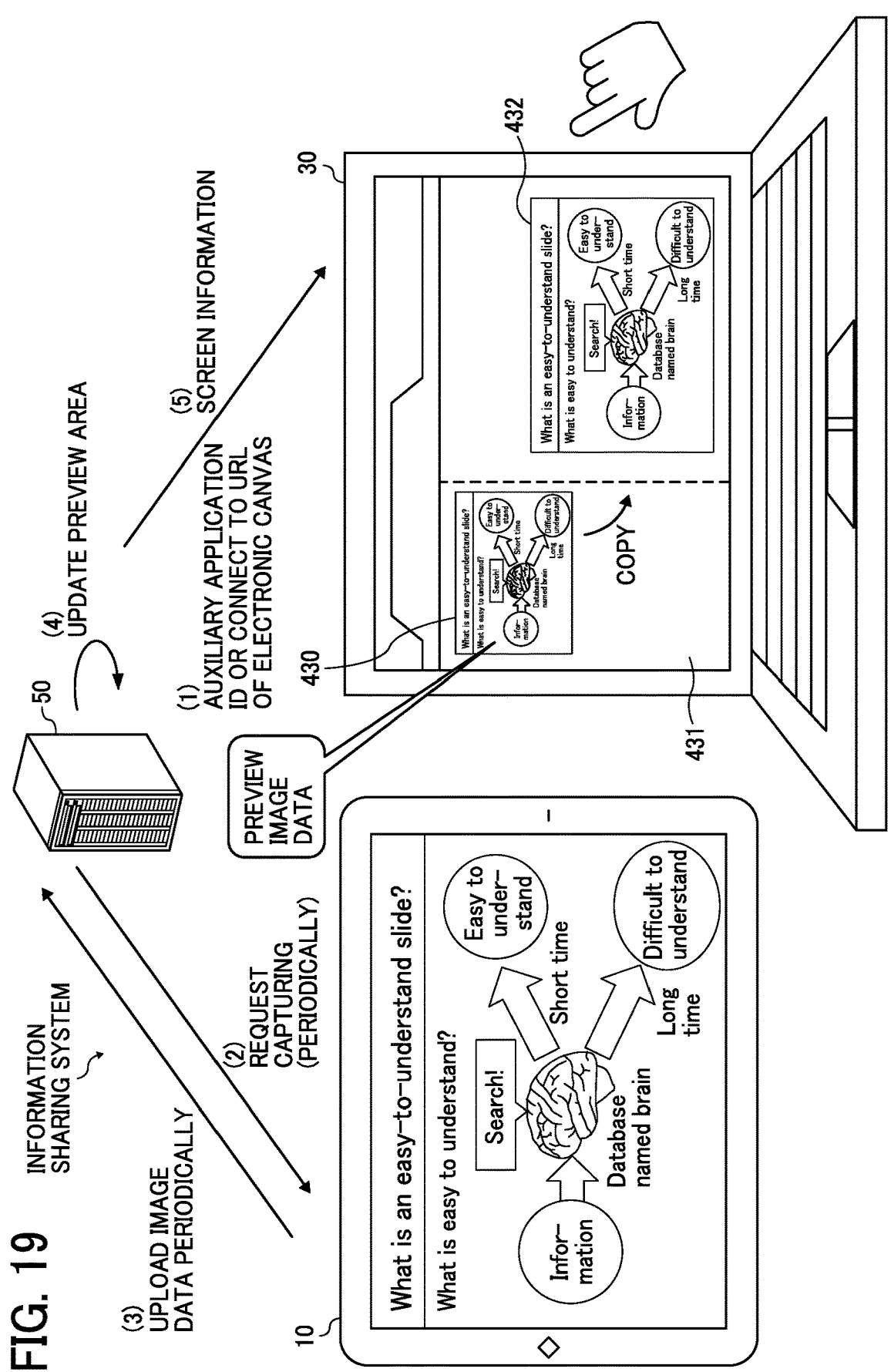
FIG. 19 is an example illustration for describing capturing in a case where the second terminal displays a preview, according to an embodiment of the present disclosure.

FIG. 19 is an example illustration for describing capturing in a case where the second terminal 30 displays a preview. According to the screen capture procedure of either the first or the second embodiment, the second terminal 30 continuously displays a preview 430 of image data of the screen. An overview of the operation is provided hereinafter.

(1) First, at the stage of displaying the preview 430, the second terminal 30 does not have to send a capture request. However, in the method of the first embodiment, the second terminal 30 transmits the auxiliary application ID to the image management server 50 at least once. In the method of the second embodiment, the second terminal 30 connects to the URL of the electronic canvas.

(2) The image management server 50 periodically transmits a capture request to the first terminal 10. Even in a case where no periodic capture request is transmitted, the first terminal 10 can upload image data of the screen that is captured periodically or in response to detection of a change of the screen.

(3) The first terminal 10 uploads image data of the screen to the image management server 50.

(4) The image management server 50 updates the preview 430 (image data of the screen of the first terminal 10) to be displayed in a preview area 431 of the second terminal 30 to the latest image data of the screen, in screen information of the electronic canvas.

(5) The second terminal 30 periodically transmits a request for screen information to the URL of the electronic canvas. This enables the second terminal 30 to continuously display the preview 430 of the screen of the first terminal 10.

In this case, a screen of the electronic canvas is divided into, for example, the preview area 431 and a handwriting area 432. When a user presses the capture button 407, the image data in the preview area 431 is copied and displayed in the handwriting area 432. Since the second terminal 30 transmits the copied image data to the image management server 50, the screen information in the image management server 50 is also updated.

Figure 20:
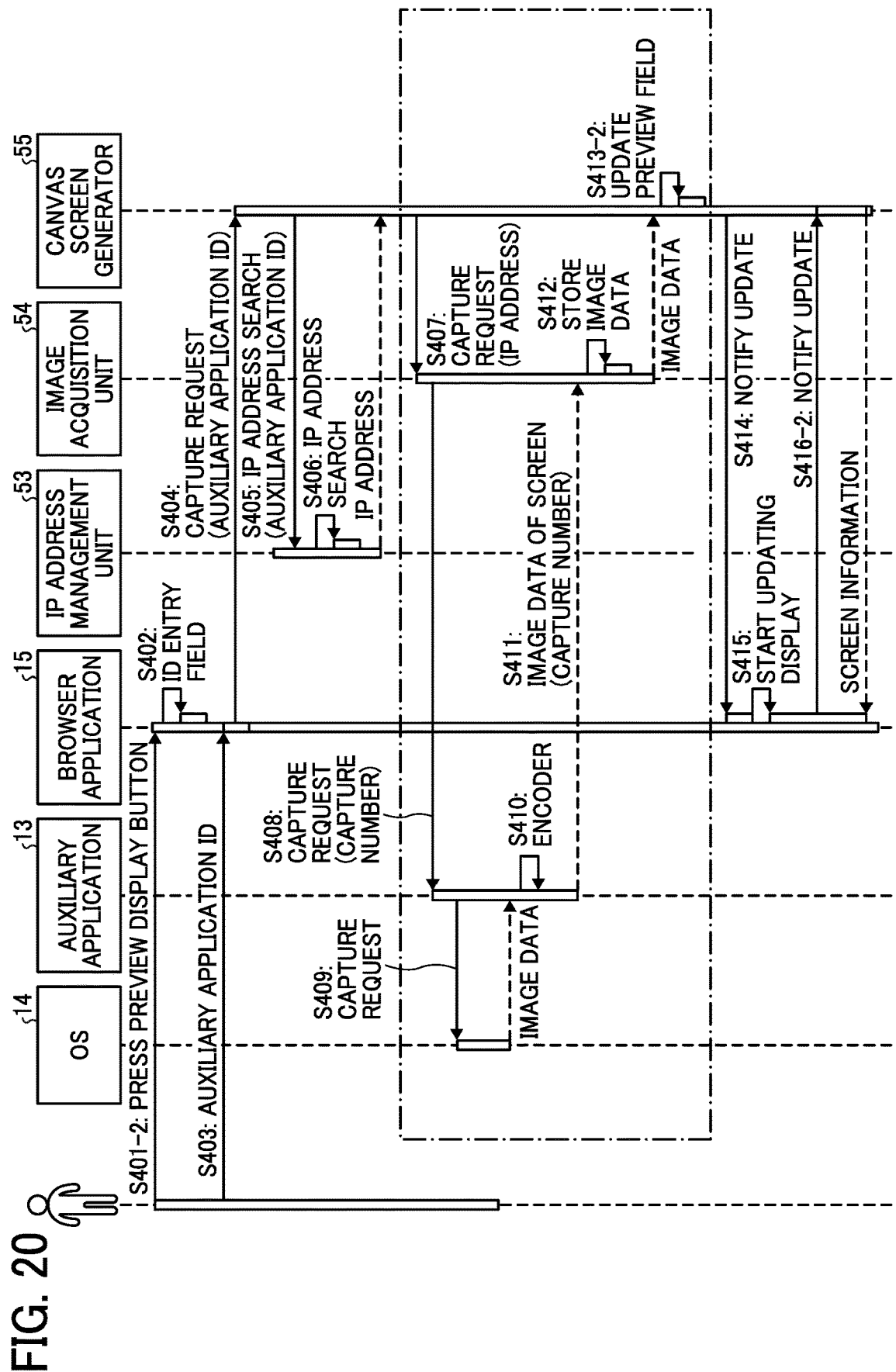
FIG. 20 is a sequence diagram illustrating an example of an operation in which the first terminal captures a screen and the second terminal displays image data of a screen of the material display application, according to an embodiment of the present disclosure.

FIG. 20 is a sequence diagram illustrating an example of an operation in which the first terminal 10 captures a screen and the second terminal 30 displays image data of a screen of the material display application 11. In the following description of FIG. 20, the differences from FIG. 13 are focused.

S401-2: When a user wants to cause the second terminal 30 to display a preview of a screen of the first terminal 10, the user presses a preview button displayed in the menu 401, for example. The operation receiving unit 24 receives the pressing of the preview button. In another example, the electronic canvas application 12 starts displaying the preview without the user's operation for displaying the preview.

The processes from step S402 to step S407 can be the same as those of FIG. 13. Further, the image management server 50 periodically repeats the processes from step S408 to step S413-2. In another example, the image management server 50 monitors the load to perform the processes when the load is low. In still another example, the image management server 50 performs the processes irregularly. In step S413-2, the canvas screen generator 55 updates the preview area 431 in the screen information to the latest image data of the screen. Subsequent steps from S414 can be the same as those of FIG. 13.

In other words, the sequence diagram can be substantially the same as that of the first embodiment. In addition, although in FIG. 20, the sequence diagram of the first embodiment is taken as an example, the operation can be performed in substantially the same manner using the sequence diagram of the second embodiment. With this method, it is possible to shorten the waiting time of a user until image data of the screen is displayed.

In the above, a description is given of an example in which the image data in the preview area 431 is copied when the user actually presses the capture button 407. In another example, the operation illustrated in the sequence diagram of FIG. 13 or FIG. 18 may be performed in response to the pressing of the capture button 407 to cause the second terminal 30 to acquire the image data. Since image quality of the preview 430 is sometimes deteriorated due to compression or the like, the second terminal 30 acquires the image data again, so that deterioration in image quality of the image data displayed by the electronic canvas can be suppressed.

According to the present embodiment, the second terminal 30 displays a preview of the screen of the first terminal 10 even if a user does not press the capture button 407. This enables the user to determine whether to capture after viewing the preview on the second terminal 30.

Fourth Embodiment

Figure 21:
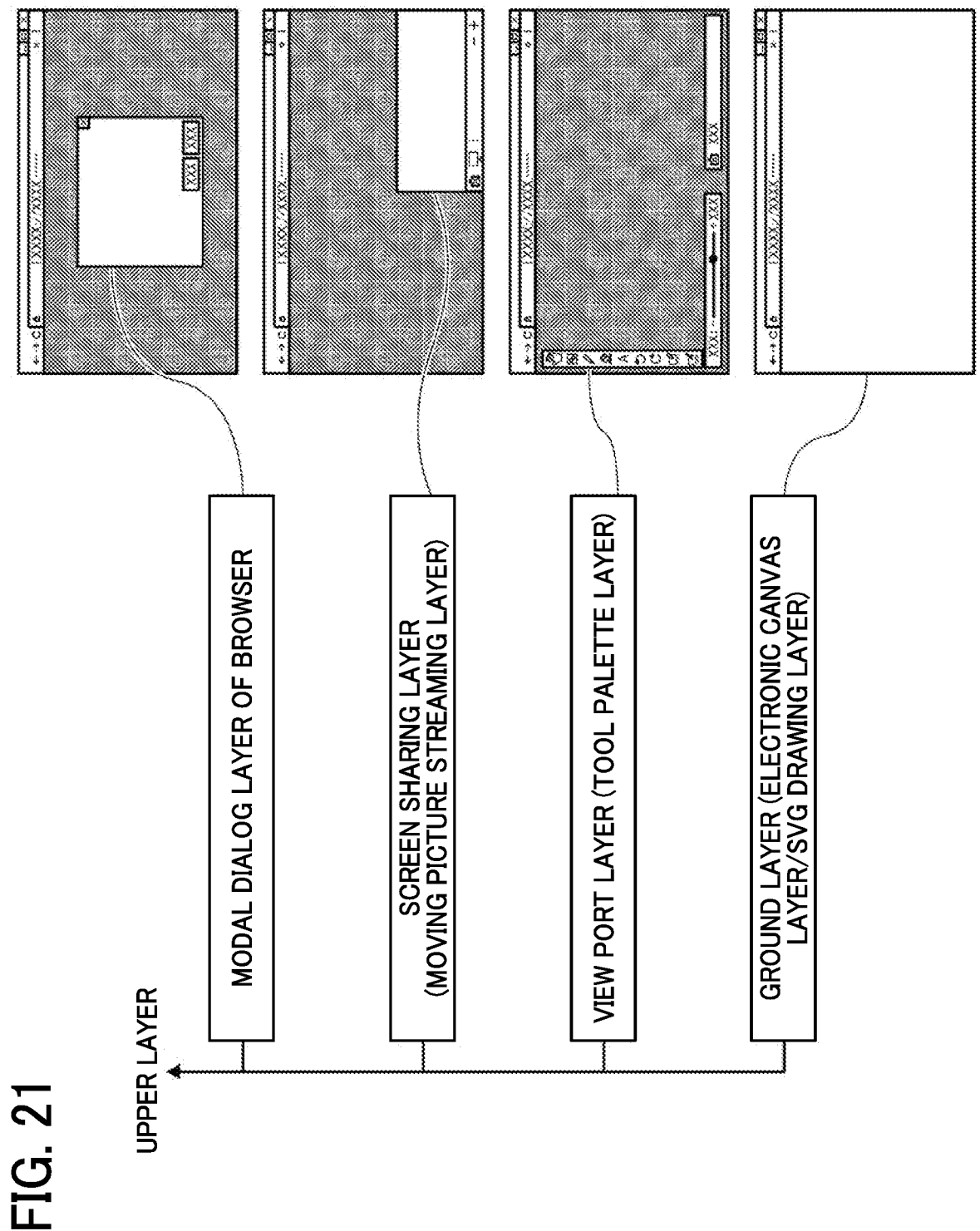
FIG. 21 is a diagram illustrating a layer structure of a screen displayed by the second terminal, according to an embodiment of the present disclosure.

Next, a variation of a screen displayed by the second terminal 30 is described with reference to FIG. 21 to FIG. 29. FIG. 21 is a diagram illustrating a layer structure of a screen displayed by the second terminal 30. FIG. 22 to FIG. 29 are diagrams each illustrating an example of screen displayed by the second terminal 30.

As illustrated in FIG. 21, the second terminal 30 displays a screen having a four-layer structure. The lowermost layer is a ground layer (electronic canvas layer or SVG (scalable vector graphics) drawing layer). A layer provided on the ground layer is a view port layer (tool palette layer). A layer provided on the view port layer is a screen sharing layer (moving picture streaming layer). A layer provided on the screen sharing layer is a modal dialog layer of the browser. In the following description, the display control unit 21 performs display processing, and the operation receiving unit 24 receives operations of a mouse, an electronic pen, or the like.

Figure 22:
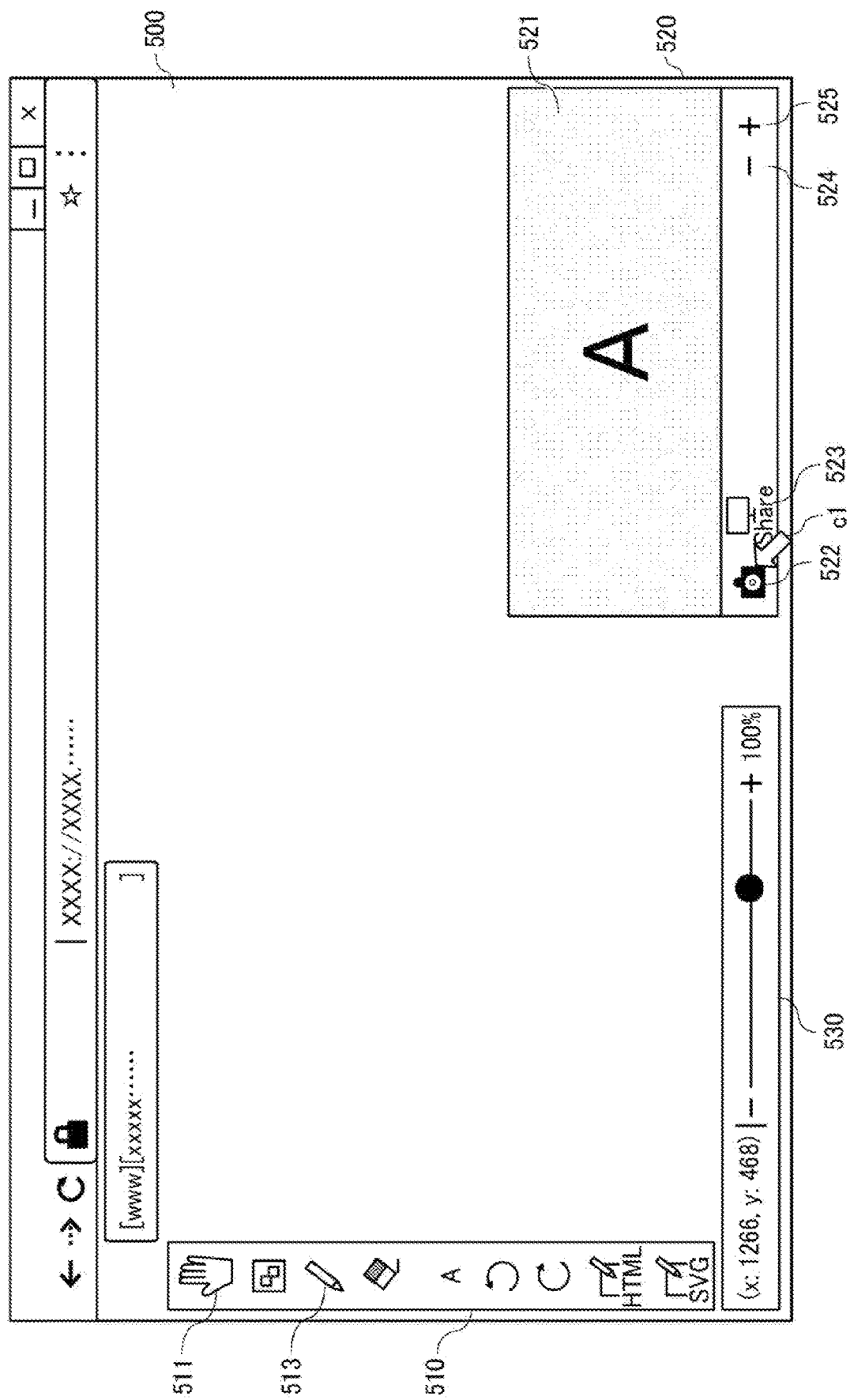
FIG. 22 is a diagram illustrating an example of a screen of the second terminal, according to an embodiment of the present disclosure.

As illustrated in FIG. 22, the display control unit 21 of the second terminal 30 displays a ground area 500 on the display 3. On the ground area 500, a view port area 510, a screen sharing area 520, and a scaling specifying area 530 are included.

The view port area 510 includes a screen shift button 511 having the same function as the screen shift button 404, a pen button 513 having the same function as the pen button 402, etc.

The screen sharing area 520 includes a sharing area 521, a capture button 522, a transmission/reception switching button 523, a reduction button 524, and an enlargement button 525. The sharing area 521 is an area for displaying a shared screen information. The capture button 522 has the same function as the capture button 407. The transmission/reception switching button 523 is a button for switching between reception and transmission of image data of the screen. The reduction button 524 is a button for reducing the screen sharing area 520 having a normal size. The enlargement button 525 is a button for enlarging the screen sharing area 520.

The scaling specifying area 530 is an area in which a scrollbar for changing the size of the ground area 500 is displayed.

Figure 23:
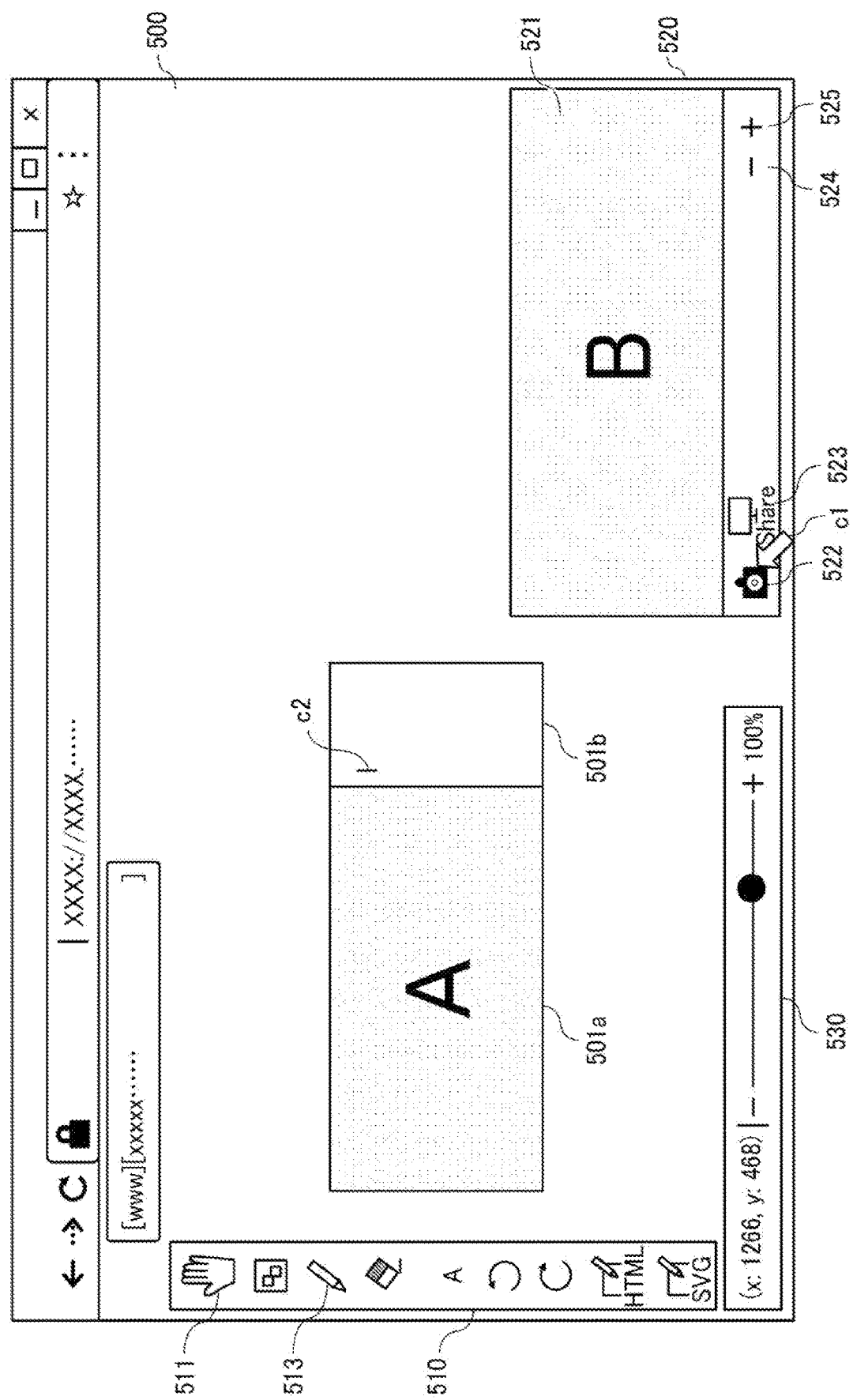
FIG. 23 is a diagram illustrating an example of a screen of the second terminal, according to an embodiment of the present disclosure.

In FIG. 22, an image "A" of a screen being displayed on the first terminal 10 is displayed in the sharing area 521, which is provided at the lower right of the ground area 500. In other words, image data of the image "A" is shared between the first terminal 10 and the second terminal 30. In the state illustrated in FIG. 22, when a user presses the capture button 522 with a cursor c1 using a mouse or the like, a captured-image display area 501a including the image "A" is displayed at the left center of the ground area 500, as illustrated in FIG. 23. At the same time, a character input area 501b in which characters can be entered is displayed on the right side of the captured-image display area 501a. In addition, a caret c2 is initially displayed in the character input area 501b, allowing the user to promptly enter comments. The cursor c1 is displayed over the capture button 522, allowing the user to promptly instruct capturing subsequently.

Figure 24:
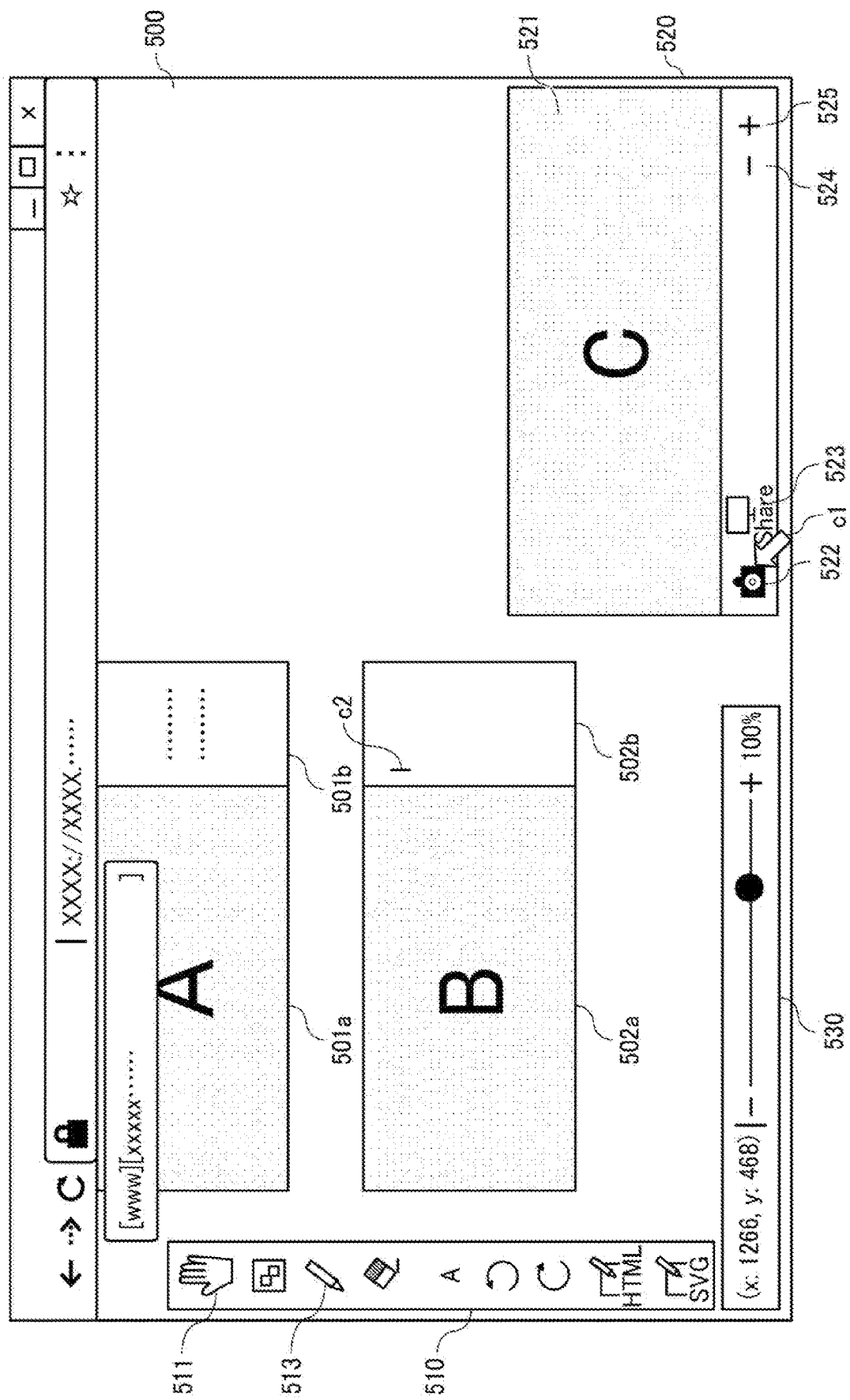
FIG. 24 is a diagram illustrating an example of a screen of the second terminal, according to an embodiment of the present disclosure.

When the user subsequently presses the capture button 522 in a state where an image "B" is displayed in the sharing area 521 as illustrated in FIG. 23, a captured-image display area 502a including the image "B" is displayed at the left center of the ground area 500, as illustrated in FIG. 24. At the same time, a character input area 502b in which characters can be entered is displayed on the right side of the captured-image display area 502a. In this case, the image captured once before moves to the upper left of the ground area 500 so that the captured-image display area 502a is displayed in the left middle area of the ground area 500. Also in this case, a caret c2 is initially displayed in the character input area 502b, and the cursor c1 is displayed over the capture button 522.

Figure 25:
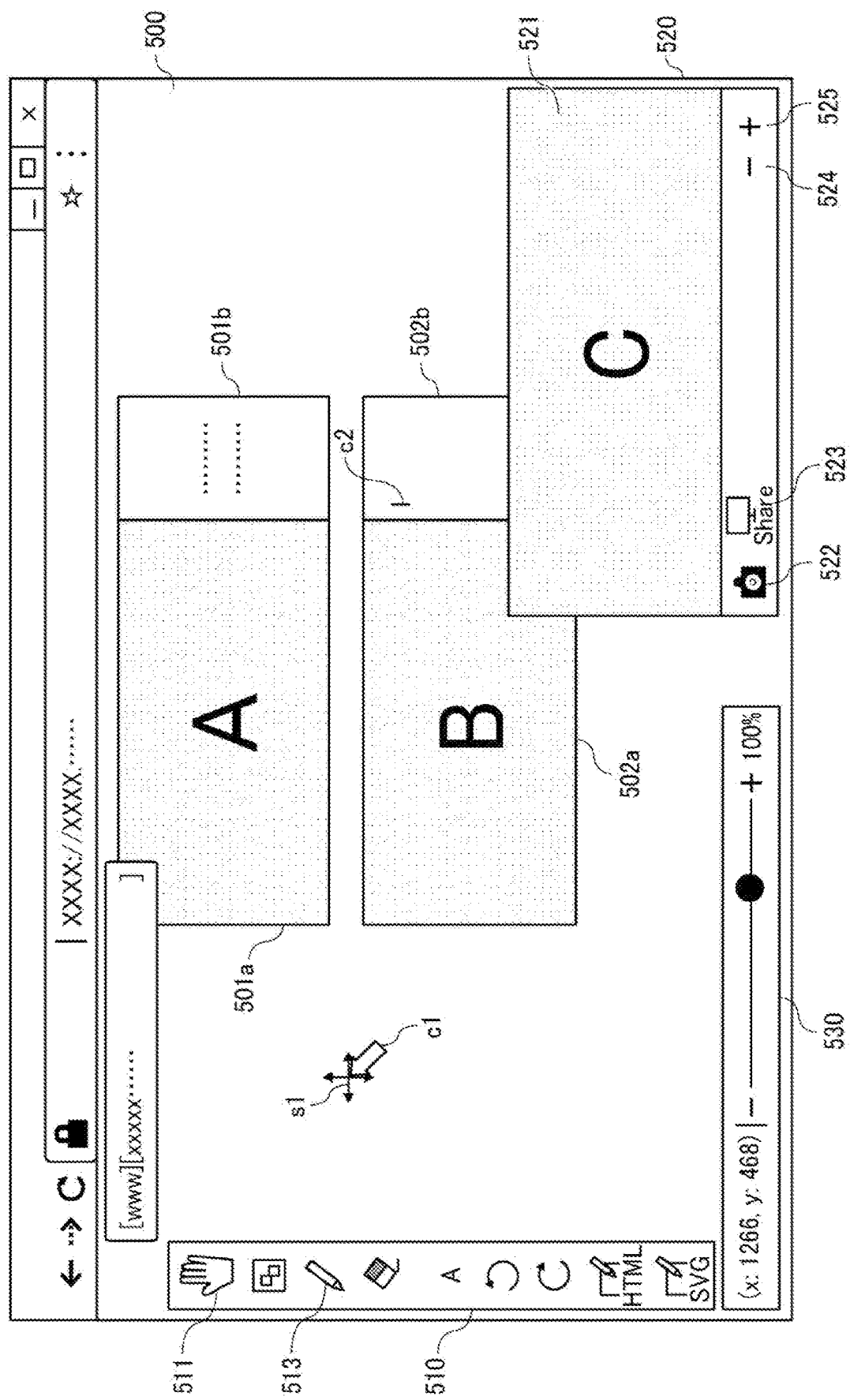
FIG. 25 is a diagram illustrating an example of a screen of the second terminal, according to an embodiment of the present disclosure.

When the user subsequently presses the screen shift button 511 with the cursor c1 in a state where an image "C" is displayed in the sharing area 521 as illustrated in FIG. 24, a screen shift mode starts operating. In the screen shift mode, as illustrated in FIG. 25, a scroll icon s1 for scrolling the ground area 500 is displayed. When the user moves the scroll icon s1 with the cursor c1, an entire image in the ground area 500 is shifted in accordance with the movement of the scroll icon. FIG. 25 illustrates an example case where the entire image is shifted to the right side compared with FIG. 24. The position of the screen sharing area 520 does not change.

Figure 26:
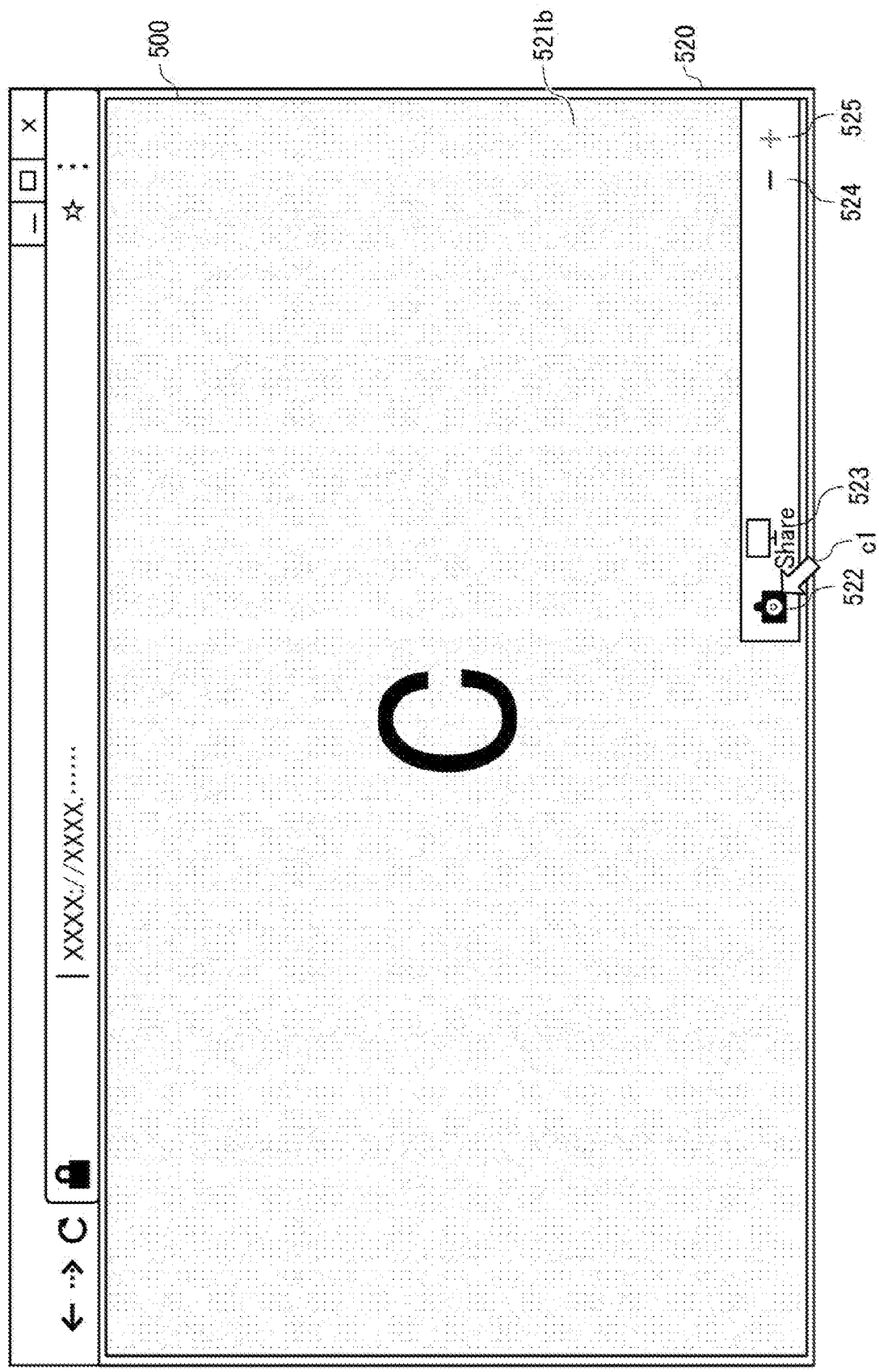
FIG. 26 is a diagram illustrating an example of a screen of the second terminal, according to an embodiment of the present disclosure.

When the user subsequently presses the enlargement button 525 with the cursor c1 in a state where the image "C" is displayed in the sharing area 521 as illustrated in FIG. 25, a sharing area 521b enlarged over almost the entire area of the ground area 500 is displayed, as illustrated in FIG. 26. In this case, a display density of the enlargement button 525 becomes light, and the button is invalidated. This indicates that the sharing area 521b cannot be enlarged any more. When the user presses the capture button 522 with the cursor c1 in this state, a new captured-image display area of the image "C" and a new character input area on the right side of the captured-image display area are added in the ground area 500 hidden in a lower layer behind the sharing area 521b. In another example, instead of the above-described example in which the sharing area 521b having substantially the same size of the entire area of the ground area 500 is displayed when the enlargement button 525 is pressed once, the sharing area is enlarged gradually several times to the size of the sharing area 521b each time the enlargement button 525 is pressed.

Figure 27:
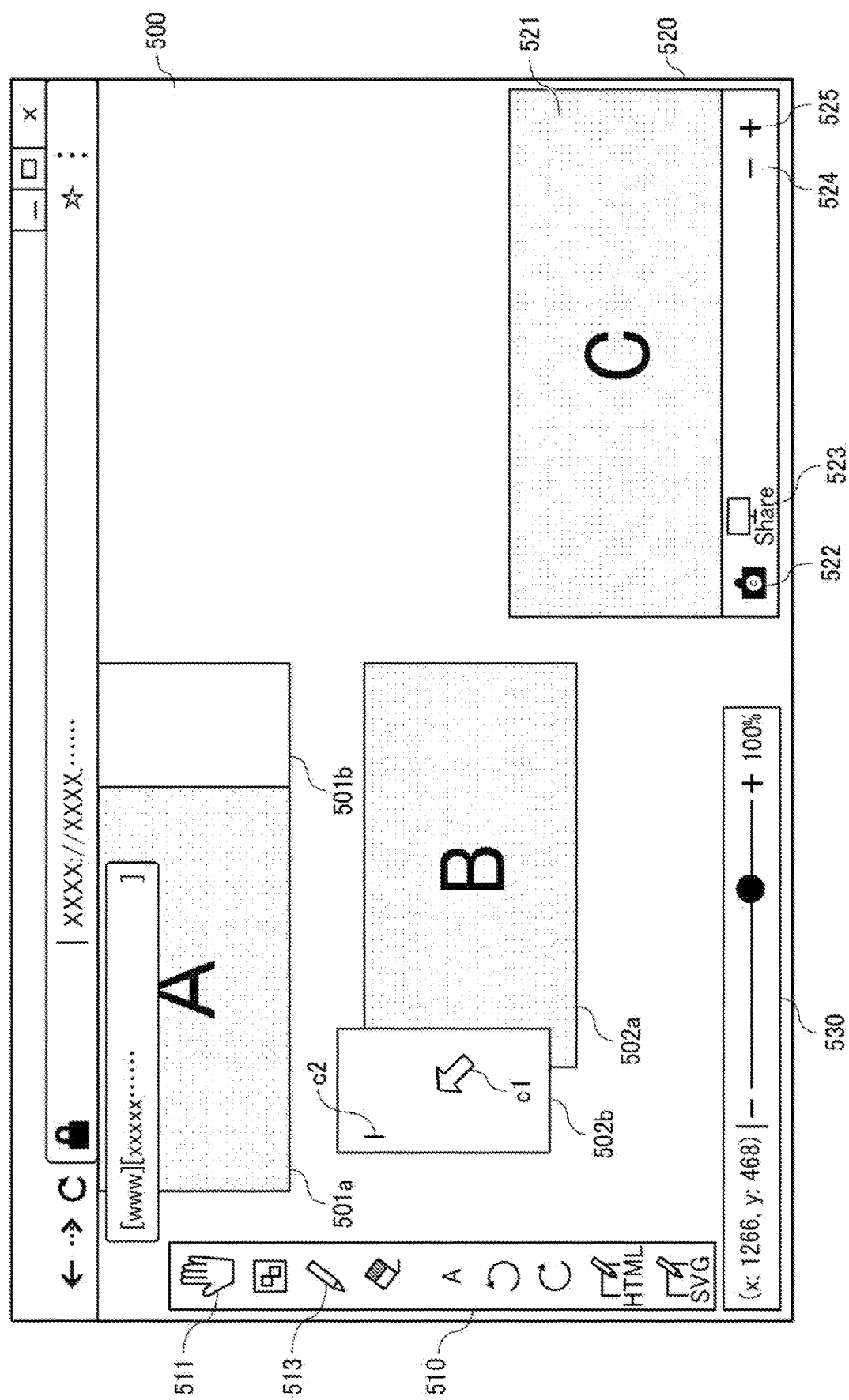
FIG. 27 is a diagram illustrating an example of a screen of the second terminal, according to an embodiment of the present disclosure.

Variation 1:

From the state illustrated FIG. 24, the user can move independently each captured-image display area and each character input area with the cursor c1. FIG. 27 illustrates a state in which the character input area 502b is currently being moved to the left after moving the captured-image display area 502a to the right.

Figure 28:
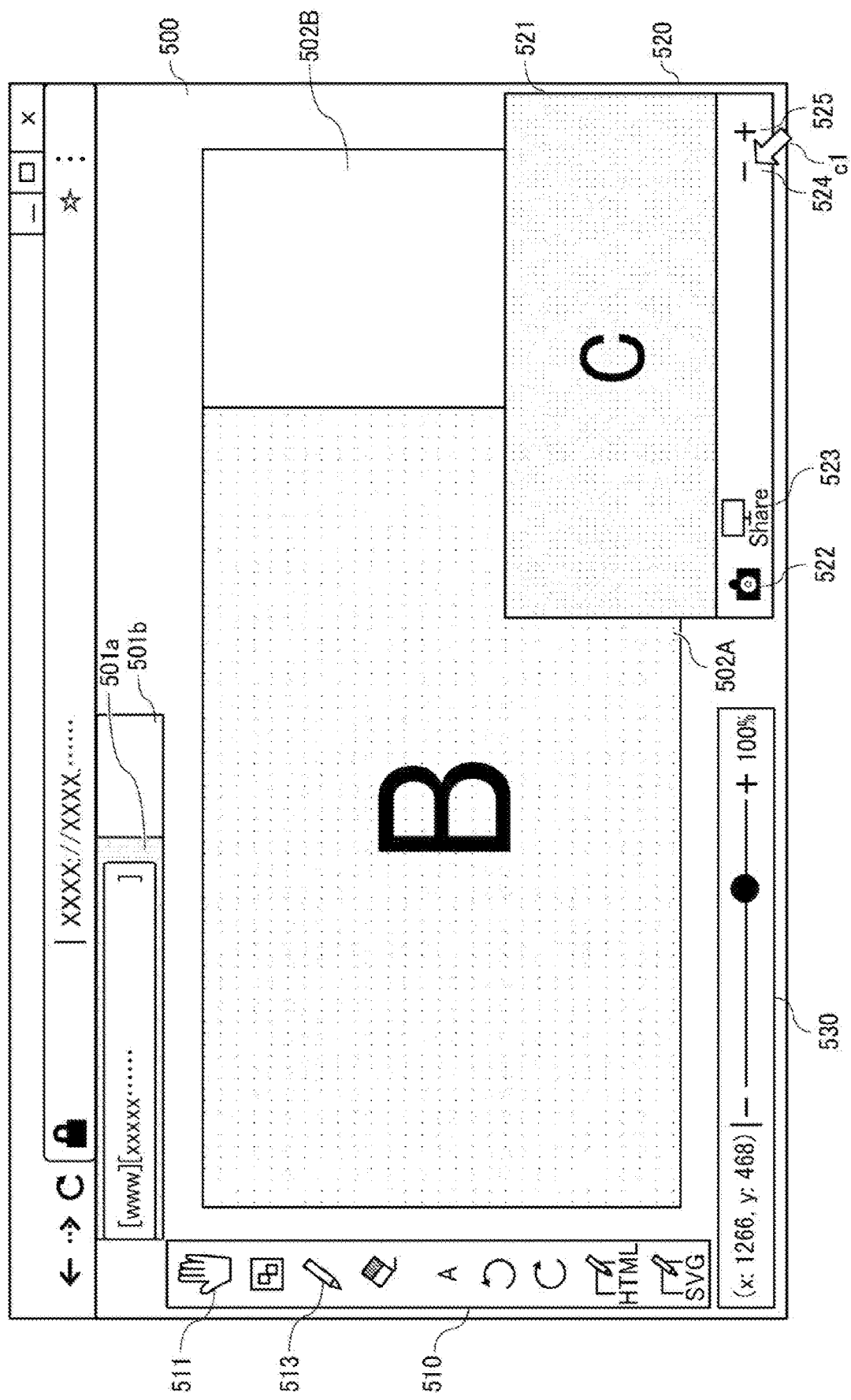
FIG. 28 is a diagram illustrating an example of a screen of the second terminal, according to an embodiment of the present disclosure.

Variation 2:

In another example, as illustrated in FIG. 28, the latest captured-image display area 502A and the latest character input area 502B are displayed with a larger size than the captured-image display area 501a and the captured-image display area 502a. In this case, the sharing area 521 is displayed on an upper layer (front) of the captured-image display area 502A and the character input area 502B.

Figure 29:
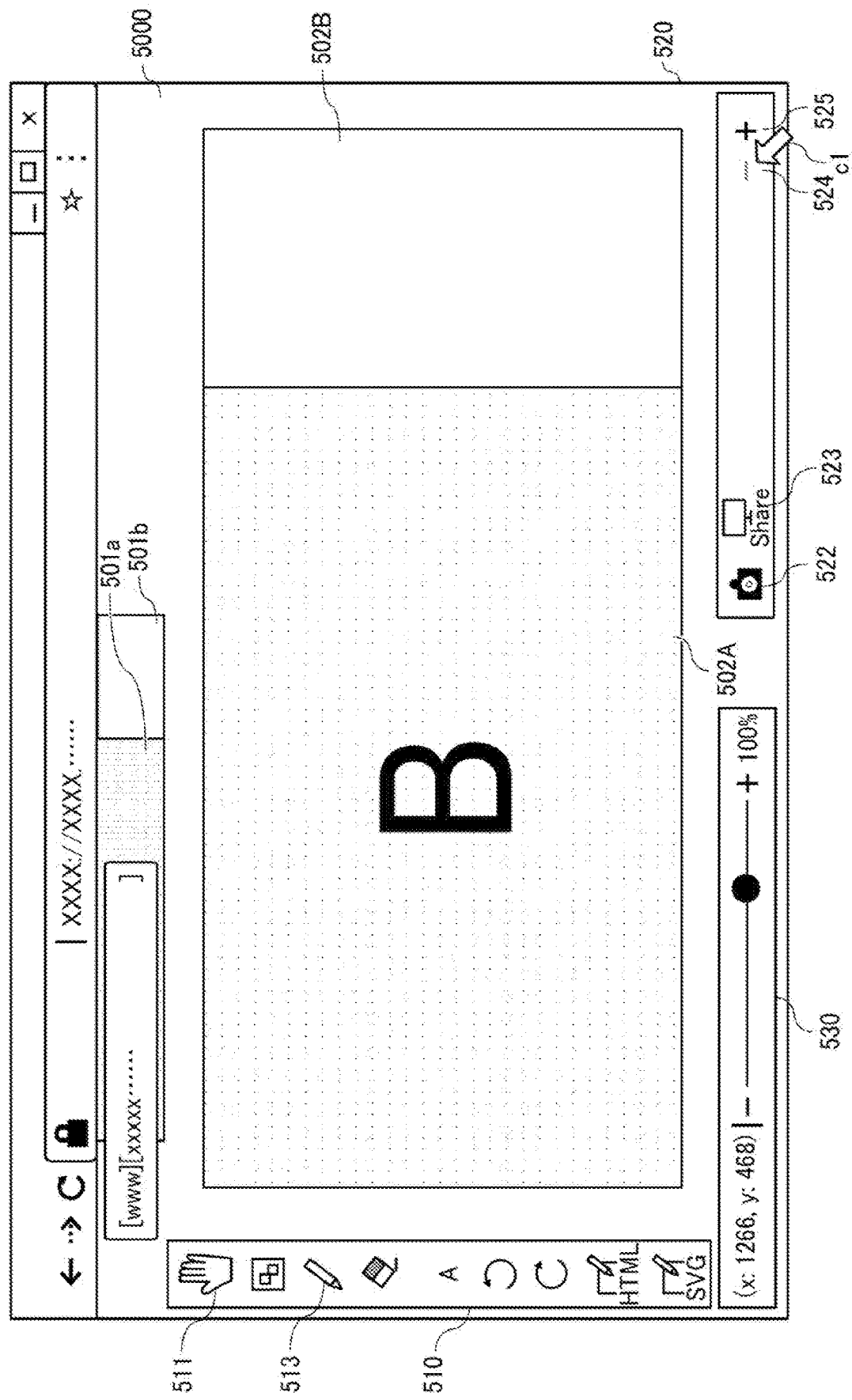
FIG. 29 is a diagram illustrating an example of a screen of the second terminal, according to an embodiment of the present disclosure.

In still another example, when the user presses the reduction button 524 with the cursor c1, the sharing area 521 is not displayed, as illustrated in FIG. 29. In this case, the display density of the reduction button 524 becomes light, and the button is invalidated. This indicates that the sharing area 521 cannot be reduced any more.

According to the present embodiment, when a user captures a screen that is being shared, an image of the captured screen is displayed with a character input area that allows a user to promptly enter a comment. This enables a user to enter comments speedily.

Variation:

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

For example, although in the present embodiment, an example in which the Canvas element of HTML 5 is used, in another example, WebGL, SVG (scalable vector graphics), FLASH (registered trademark), etc. can be used.

Further, the electronic canvas application 12 can be provided not only as a web application but also as an application that does not require a browser application.

Furthermore, although it is preferable that a user of the second terminal 30 is present in the same space where the first terminal 10 is provided, the user of the second terminal 30 does not have to be present in the same space where the first terminal 10 is provided. The auxiliary application ID or the URL of the electronic canvas is notified to users outside a company by e-mail or the like so that the users outside the company can share the screen.

In addition, in the example of functional configuration as illustrated in FIG. 6 or the like, processes performed by the first terminal 10, the second terminal 30 and the image management server 50 are divided based on main functions in order to facilitate understanding of processes. No limitation is intended by how the processes are divided or by the name of the processes. The processes implemented by the first terminal 10, the second terminal 30 and the image management server 50 can be divided to a larger number of processes according to contents of processes. Further, one process can be divided to include a larger number of processes.

The material display application 11 is an example of a first application. The auxiliary application 13 is an example of a second application.

What is claimed is:

1. An information sharing system, comprising:
a first terminal that includes first processing circuitry configured to control a first display to display a first screen shareable by a plurality of users and display particular identification information identifying the first terminal;
a second terminal that is operated by a user of the plurality of users, the second terminal including second processing circuitry configured to control a second display to display a second screen to be viewed by the user; and
an information management apparatus communicable with the first terminal and the second terminal via a network, wherein
the second processing circuitry is configured to transmit, to the information management apparatus, a screen acquisition request that requests acquisition of the first screen displayed by the first display, in response to a capture request screen operation performed on the second display, the capture request screen operation including input, by the user, of the particular identification information displayed on the first display of the first terminal,
the information management apparatus comprises third processing circuitry configured to:
transmit, to the first terminal, in response to the screen acquisition request from the second terminal, a request for image data;
acquire, from the first terminal, image data of the first screen displayed by the first terminal; and
update screen information to be transmitted to the second terminal according to the acquired image data, and
the second processing circuitry is further configured to:
receive the screen information from the information management apparatus; and
control the second display to update the second display based on the received screen information.

2. The information sharing system of claim 1, wherein the information management apparatus further comprises a memory,
the third processing circuitry is further configured to store, in the memory, for each of a plurality of first terminals including the first terminal, identification information identifying each of the plurality of first terminals in association with address information of each of the plurality of first terminals,
the second processing circuitry is further configured to transmit the input particular identification information identifying the first terminal together with the screen acquisition request, and
the third processing circuitry is further configured to:
obtain, from the memory, particular address information associated with the particular identification information of the first terminal that is received from the second terminal; and
transmit the request for the image data to the first terminal identified by the particular address information.

3. The information sharing system of claim 2, wherein the first processing circuitry is further configured to operate according to a first application that displays materials on the first screen and a second application configured with the particular identification information identifying the first terminal,
the second application transmits, to the information management apparatus, the input particular identification information identifying the first terminal and the particular address information of the first terminal, and
the third processing circuitry is further configured to store the particular identification information identifying the first terminal and the particular address information of the first terminal that are transmitted from the second application in the memory in association with each other.

4. The information sharing system of claim 1, wherein the third processing circuitry is further configured to:
generate a particular URL for use by the second terminal to access the screen information;
receive, from the second terminal, the particular URL together with the screen acquisition request;
retrieve, from a memory that stores a URL in association with address information of each of a plurality of first terminals including the first terminal, particular address information associated with the particular URL received together with the screen acquisition request; and
transmit the request for the image data to the first terminal identified by the particular address information.

5. The information sharing system of claim 4, wherein the first terminal displays the particular URL on the first screen, and
the second processing circuitry is further configured to receive an input of the particular URL, which is to be transmitted to the information management apparatus together with the screen acquisition request, according to an operation by the user of the second terminal.

6. The information sharing system of claim 4, wherein in the first terminal, a first application displays materials on the first screen and a second application sends a request for generation of the particular URL,
the second application transmits the request for generation of the particular URL, and
the third processing circuitry is further configured to:
generate the particular URL in response to receiving the request from the second application; and
store the particular URL and the particular address information of the first terminal in the memory in association with each other.

7. The information sharing system of claim 1, wherein the third processing circuitry is further configured to:
repeatedly transmit the request for image data to the first terminal even without the screen acquisition request from the second terminal to acquire the image data of the first screen transmitted from the first terminal;
update a preview area of the screen information using the acquired image data of the first screen; and
transmit, to the second terminal, the updated screen information, and
the second processing circuitry is further configured to display the image data of the first screen in the preview area according to the updated screen information transmitted from the third processing circuitry.

8. The information sharing system of claim 1, wherein the second processing circuitry is further configured to transmit the screen acquisition request to the information management apparatus based on screen information generated by the information management apparatus.

9. The information sharing system of claim 1, wherein the third processing circuitry is further configured to update screen information already generated by the information management apparatus by using the image data of the first screen acquired by the third processing circuitry from the first terminal.

10. The information sharing system of claim 1, wherein the third processing circuitry is further configured to receive, as the image data of the first screen, a screen capture of the first screen.

11. An information management apparatus communicable with a first terminal and a second terminal via a network, the first terminal configured to control a first display to display a first screen shareable by a plurality of users and display particular identification information identifying the first terminal, the second terminal operated by a user of the plurality of users and the second terminal configured to control a second display to display a second screen to be viewed by the user, the information management apparatus comprising:
processing circuitry configured to:
receive, from the second terminal, in response to a capture request screen operation performed on the second display, a screen acquisition request that requests acquisition of the first screen displayed by the first terminal, the capture request screen operation including input, by the user, of the particular identification information displayed on the first display of the first terminal;
transmit, to the first terminal in response to the received screen acquisition request, a request for image data;
acquire, from the first terminal, image data of the first screen displayed by the first terminal; and
update screen information to be transmitted to the second terminal according to the acquired image data.

12. The information management apparatus of claim 11, wherein the processing circuitry is further configured to transmit the updated screen information to the second terminal so that the second terminal updates the second display based on the received screen information.

13. The information management apparatus of claim 11, further comprising a memory, wherein
the processing circuitry is further configured to:
store, in the memory for each of a plurality of first terminals including the first terminal, identification information identifying each of the plurality of first terminals in association with address information of each of the plurality of first terminals;
receive the input particular identification information identifying the first terminal together with the screen acquisition request;
obtain, from the memory, particular address information associated with the particular identification information that is received together with the screen acquisition request; and
transmit the request for the image data to the first terminal identified by the particular address information.

14. The information management apparatus of claim 13, wherein
the first terminal includes first processing circuitry that operates according to a first application that displays materials on the first screen and a second application configured with the particular identification information identifying the first terminal, and
the processing circuitry is further configured to store the particular identification information identifying the first terminal and the particular address information of the first terminal that are transmitted from the second application in the memory in association with each other.

15. A terminal operated by a user of a plurality of users, the terminal comprising:
processing circuitry configured to:
control a first display to display a first screen to be viewed by the user;
transmit, to an information management apparatus that is communicable with the terminal and a second terminal via a network, in response to a capture request screen operation performed on the first display, a screen acquisition request that requests acquisition of a second screen displayed by a second display controlled by the second terminal and that is shareable by the plurality of users, wherein the second display of the second terminal displays particular identification information identifying the second terminal and the capture request screen operation includes input, by the user, of the particular identification information displayed on the second display of the second terminal;
receive screen information from the information management apparatus, the screen information having been updated by the information management apparatus according to image data acquired by the information management apparatus from the second terminal; and
control the first display to update the first display based on the received screen information.

16. The terminal of claim 15, wherein
the processing circuitry is further configured to transmit the input particular identification information identifying the second terminal together with the screen acquisition request, and
the information management apparatus is configured to:
obtain particular address information associated with the particular identification information of the second terminal that is received from the terminal; and
transmit the request for the image data to the second terminal identified by the particular address information.

17. The terminal of claim 15, wherein
the second terminal displays a particular URL on the second screen, and
the processing circuitry is further configured to receive an input of the particular URL, which is transmitted to the information management apparatus together with the screen acquisition request, according to an operation by the user.

18. The terminal of claim 15, wherein the processing circuitry is further configured to transmit the screen acquisition request to the information management apparatus, based on screen information generated by the information management apparatus.

* * * * *